(12) United States Patent
Shmilovich et al.

(10) Patent No.: US 7,597,289 B2
(45) Date of Patent: Oct. 6, 2009

(54) APPARATUS AND METHOD FOR THE CONTROL OF TRAILING WAKE FLOWS

(75) Inventors: Arvin Shmilovich, Huntington Beach, CA (US); Yoram Yadlin, Irvine, CA (US); Roger Clark, Hungtington Beach, CA (US); Donald Leopold, Rancho Santa Margarita, CA (US)

(73) Assignee: The Boeing Company, Chicago, IL (US)

(*) Notice: Subject to any disclaimer, the term of this patent is extended or adjusted under 35 U.S.C. 154(b) by 454 days.

(21) Appl. No.: 11/332,835

(22) Filed: Jan. 13, 2006

(65) Prior Publication Data

US 2007/0045476 A1 Mar. 1, 2007

Related U.S. Application Data

(63) Continuation of application No. 10/784,067, filed on Feb. 20, 2004, now Pat. No. 7,100,875.

(51) Int. Cl.
*B64C 23/00* (2006.01)
(52) U.S. Cl. .................... 244/199.3; 244/207
(58) Field of Classification Search ............. 244/35 A, 244/130, 199.1, 199.2, 199.3, 199.4, 207
See application file for complete search history.

(56) References Cited

U.S. PATENT DOCUMENTS

| | | | | |
|---|---|---|---|---|
| 2,477,461 A | * | 7/1949 | Lee | ............ 244/199.3 |
| 2,650,781 A | | 9/1953 | Taylor | |
| 3,012,740 A | | 12/1961 | Wagner | |
| 3,090,584 A | | 5/1963 | Kuchemann et al. | |
| 3,480,234 A | | 11/1969 | Cornish | |
| 3,596,854 A | * | 8/1971 | Haney, Jr. | ........... 244/199.3 |
| 3,604,661 A | * | 9/1971 | Mayer, Jr. | ............ 244/207 |
| 3,692,259 A | * | 9/1972 | Yuan | ........... 244/199.3 |
| 3,841,587 A | | 10/1974 | Freed | |
| 3,845,918 A | | 11/1974 | White, Jr. | |
| 3,881,669 A | * | 5/1975 | Lessen | ........... 244/199.3 |
| 3,936,013 A | | 2/1976 | Yuan | |

(Continued)

FOREIGN PATENT DOCUMENTS

DE 1756541 4/1970

(Continued)

OTHER PUBLICATIONS

Lewellen, D.C. et al., "Large-Eddy Simulations and Lidar Measurements of Vortex-Pair Breakup in Aircraft Wakes," Aug. 8, 1998, AIAA Journal, vol. 36 No. 8, pp. 1439-1445.

(Continued)

*Primary Examiner*—Rob Swiatek
(74) *Attorney, Agent, or Firm*—Perkins Coie LLP

(57) ABSTRACT

A system and method for dissipating vortices that form at the wingtips on aircraft and from other airfoils. A jet air stream is discharged in a location at or proximate to the outer end portion of the airfoil into the vortex flow, and the jet air stream is moved cyclically back and forth. The cyclic movement can be at lower or higher frequencies to alleviate at least in part intensity of the vortex or accelerate instability of the vortex which leads to vortex dissipation.

50 Claims, 18 Drawing Sheets

U.S. PATENT DOCUMENTS

| | | | |
|---|---|---|---|
| 3,974,986 | A | 8/1976 | Johnstone |
| 3,984,070 | A | 10/1976 | Patterson, Jr. |
| 3,997,132 | A | 12/1976 | Erwin |
| 4,477,042 | A | 10/1984 | Griswold, II |
| 4,860,976 | A * | 8/1989 | McFadden et al. .......... 244/207 |
| 5,150,859 | A | 9/1992 | Ransick |
| 5,158,251 | A | 10/1992 | Taylor |
| 5,492,289 | A | 2/1996 | Nosenchuck et al. |
| 5,634,613 | A | 6/1997 | McCarthy |
| 5,755,408 | A | 5/1998 | Schmidt et al. |
| 5,758,823 | A | 6/1998 | Glezer et al. |
| 5,806,807 | A | 9/1998 | Haney |
| 5,813,625 | A | 9/1998 | Hassan et al. |
| 5,918,835 | A | 7/1999 | Gerhardt |
| 5,938,404 | A | 8/1999 | Domzalski et al. |
| 5,957,413 | A | 9/1999 | Glezer et al. |
| 5,988,522 | A | 11/1999 | Glezer et al. |
| 6,082,679 | A | 7/2000 | Crouch et al. |
| 6,123,145 | A | 9/2000 | Glezer et al. |
| 6,129,309 | A | 10/2000 | Smith et al. |
| 6,138,955 | A | 10/2000 | Gutmark et al. |
| 6,283,406 | B1 | 9/2001 | Remington et al. |
| 6,378,807 | B1 | 4/2002 | Tomioka |
| 6,394,397 | B1 | 5/2002 | Ngo et al. |
| 6,422,518 | B1 | 7/2002 | Stuff et al. |
| 6,424,408 | B1 | 7/2002 | Ooga |
| 6,425,553 | B1 | 7/2002 | Smith et al. |
| 6,471,477 | B2 | 10/2002 | Hassan et al. |
| 6,513,761 | B2 | 2/2003 | Huenecke |
| 6,554,607 | B1 | 4/2003 | Glezer et al. |
| 6,629,674 | B1 | 10/2003 | Saddoughi et al. |
| 6,668,638 | B2 | 12/2003 | Huang |
| 7,100,875 | B2 * | 9/2006 | Shmilovich et al. ...... 244/199.4 |
| 7,104,143 | B1 | 9/2006 | Powell |
| 2007/0034746 | A1 | 2/2007 | Shmilovich et al. |
| 2007/0051855 | A1 | 3/2007 | Shmilovich et al. |
| 2008/0035789 | A1 | 2/2008 | Lewis |
| 2008/0042013 | A1 | 2/2008 | Shmilovich |

FOREIGN PATENT DOCUMENTS

| | | |
|---|---|---|
| EP | 0689990 | 1/1996 |

OTHER PUBLICATIONS

Tank, W., "Airplane wake detection iwth a VHF cw bistatic radar," Jan. 1997, 13 pgs, AIAA Meeting Papers, American Institute of Aeronautics and Astronautics, Inc.

Sauvage, L., et al., "WB Separations Technology Case, Preparation of Wake Vortex Detection Technology Case, Eurocontrol EEC TRSC52/2004, Public Summary Report," 29 pgs, Mar. 2005, Leosphere, Paris, France.

Socrates Wake Vortex Tection and Tracking: A Technical Status Report, Nov. 22, 2004, 29 pgs, Flight Safety Technology, Lockheed Martin.

Rodenhiser, R., "An Ultrasonic Method for Aircraft Wake Vortex Detection," Aug. 30, 2005, 115 pgs, Worcester Polytechnic Institute.

Wall, Robert, "Airbus Cries Foul in A380 Wake Vortex Debate," 2 pgs, http://www.aviationow.com/search/AvnowSearchResult.do?reference, [accessed Jan. 10, 2006].

PCT International Search Report and Written Opinion for PCT/US07/05253; The Boeing Company; May 28, 2008; European Patent Office; 15 pgs.

U.S. Appl. No. 11/370,099, filed Mar. 6, 2006, Shmilovich.

Non-Final Office Action for U.S. Appl. No. 11/370,099, mailed on Sep. 15, 2008, 9pages.

Applicant's Response to Non-Final Office Action for U.S. Appl. No. 11/370,099, filed on Jan. 9, 2009, 17 pages.

* cited by examiner

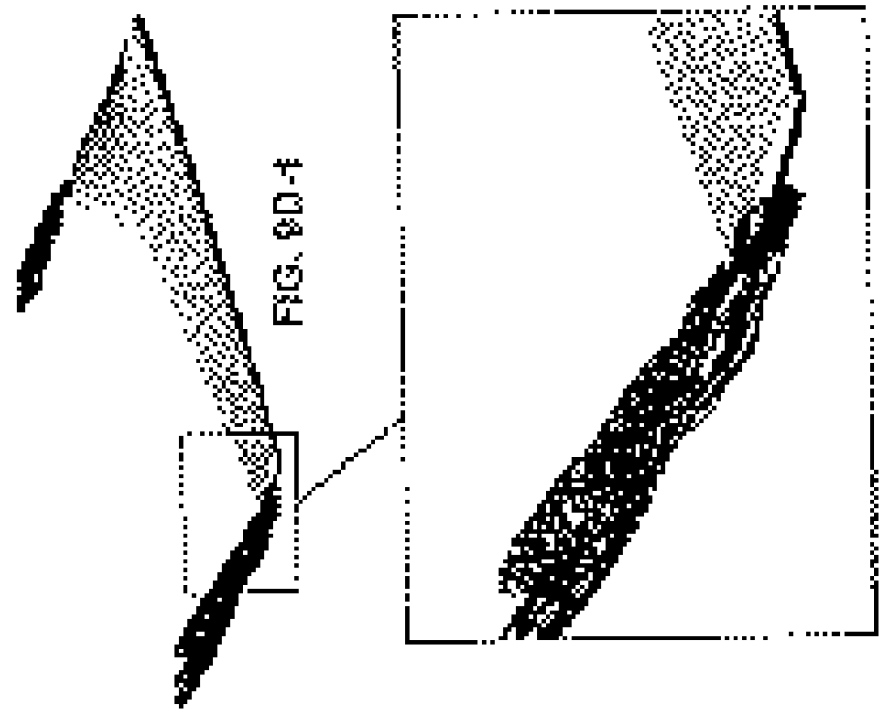
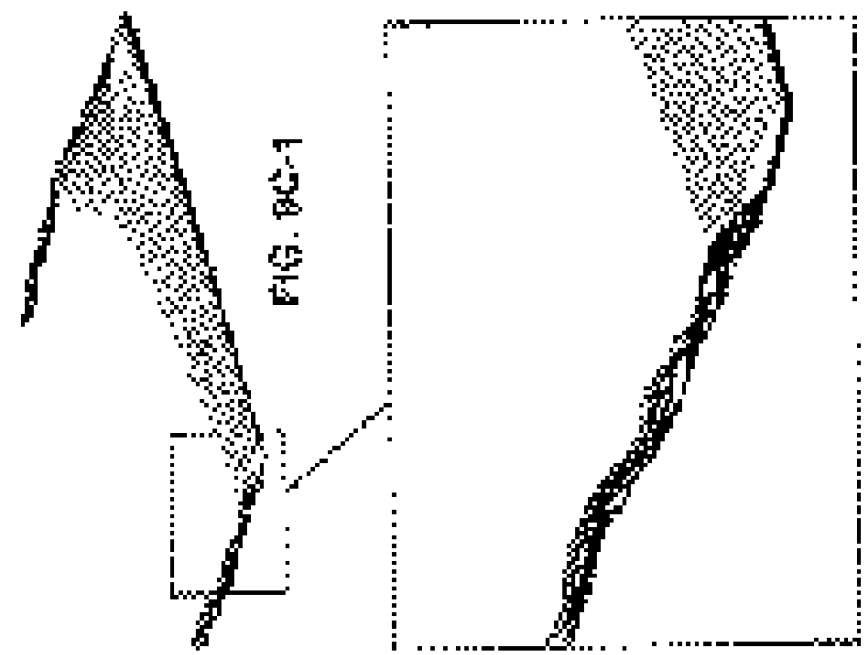

APPARATUS AND METHOD FOR THE CONTROL OF TRAILING WAKE FLOWS

This is a Continuation Application and claims priority of U.S. patent application Ser. No. 10/784,067, filed Feb. 20, 2004, now U.S. Pat. No. 7,100,875.

BACKGROUND OF THE INVENTION a) Field of the Invention

The present invention relates to alleviating the problem of vortices that form at the outer tips of aerodynamic surfaces, and more particularly the problem of such vortices which are developed by an airplane, especially a rather large airplane, traveling on a flight path, where the vortices can have adverse effects on an airplane which is following (or crossing) that same flight path.

b) Background Art

Current airport capacity is largely controlled by the hours of operation, which are largely confined to daylight hours to prevent noise pollution in the airport environs, and the frequency with which planes can be brought in and out of the airport. A pacing item in landing and takeoff frequency is the time necessary for the dissipation of wake vortices produced by planes in motion. The size and intensity of wake vortices is determined by the size and weight of the aircraft, and pose particularly dangerous conditions in the wake of wide body airplanes. In worst case scenarios, these can be sufficiently dangerous in causing airplane crashes. This problem has been recognized for several decades, and a number of approaches have been suggested to alleviate this problem.

A search of the patent literature has identified a number of patents, these being the following:

U.S. Pat. No. 6,668,638 (Huang) is directed toward controlling the vortex breakdown in an aerodynamic surface of a Delta wing aircraft. For high performance combat aircraft, operating at high incidence and high angular rates, the air flow over the control surfaces is affected by leading edge vortices which are exploited to obtain extra aerodynamic forces. There are moving blowing jets on the upper aerodynamic surface to control this breakdown of vortices and also air may be sucked in from the upper wing surface.

U.S. Pat. No. 6,378,807 (Tomioka) provides jets which blow over the wing for purposes of snow removal.

U.S. Pat. No. 6,283,406 (Remington et al) relates to reducing a high-speed impulsive and blade vortex interaction noise in a helicopter which occurs particularly when the aircraft is hovering so that the vortex of one blade affects the following blade. In one embodiment air intake passages are positioned on the surfaces of each blade proximate to the leading edge and the outer tip to admit air into the interior volume of the blade, and air output passage are disposed on the trailing edge and outer tip portion to expel air.

U.S. Pat. No. 5,813,625 (Hassan et al) relates to noise reduction in a rotorcraft. Pressurized air is directed into the rotor blade and outwardly through a plurality of apertures along a substantial surface area of the rotor blade on both the upper and lower surfaces near the leading edge and also near the tip end of the rotor blade. The pressurized fluid is in a direction generally normal to the blades surface.

U.S. Pat. No. 5,806,807 (Haney) discloses a vortex attenuating airfoil where there is a deflector 40 positioned on the top surface of the wing a short distance inboard of the end tip of the wing, and an air passage extending through the airfoil from an inlet at the lower surface of the airfoil and an outlet on the upper side of the airfoil outboard of the deflector 40.

U.S. Pat. No. 5,755,408 (Schmidt et al) shows a system for creating turbulence at the leading edge surface by ejecting pressurized air selectively, under the control of a microelectromechanical system to affect the turbulence in the boundary layer over that portion of the wing surface.

U.S. Pat. No. 5,158,251 (Taylor) relates to a wing tip vortex alleviating a system where the pressurized air is emitted through a slot 36 which is at the upper outer edge of the wings surface and aligned in a forward to rear direction. The pressurized air emitted from the slot tangentially that curves outwardly and downwardly so that it forms a "Coanda" occurrence (see FIG. 4) that extends in a chordwise direction downward from the Coanda surface 42 perpendicular to the plane of the wing. It is indicated that it is desirable that the Coanda curtain cover as great an area as possible two-dimensionally in both the chordwise (horizontal) and elevational (vertical) direction.

U.S. Pat. No. 4,477,042 (Griswold II) discusses the problem of vortex alleviation that result particularly with heavy aircraft with significant span loading so that the vortex does not adversely effect the aircraft that are following in the wake of the heavier aircraft. To alleviate this problem, the wing tip portion is contoured in one embodiment with an upward slant, and in another embodiment (FIG. 11) in a downward slant. Also, air is discharged through the outer edge of the wing, and this is described in column 6 beginning on line 37 with reference to FIGS. 6 and 7. The air is discharged through a slot 54 and is directed generally tangentially of the tip surfaces 34, 38 so that the flow of air over the surfaces joins the discharged fluid at a comparable velocity and forms a vortex which is lacking the tight laminary core. It is stated that the effect of the discharged fluid alleviates the velocity differentials of the flow and thereby decreases circulation within the vortex region.

U.S. Pat. No. 3,997,132 (Erwin) is directed toward alleviating the problem of wing tip vortices affecting aircraft which are following in the path of the vortex. There are the main jet engines 26 mounted closer to the fuselage, and in each wing tip, there are secondary jet engines 32. These are arranged so that there are guide vanes 70 that are positioned in the annular bypass duct 42. These veins 70 are directed in a manner to counteract the effect of the vortices that is developed at the wing tip.

U.S. Pat. No. 3,984,070 (Patterson Jr) is also directed to the problem of wing tip vortices affecting the aircraft which are following in the vortex. There are retractable plates which have a retracted position within a tubular member, and can be expanded to a radially extending position (FIG. 2) in the vortex dissipating mode.

U.S. Pat. No. 3,974,986 (Johnstone) relates to alleviating the problem of vortices being generated at the wing tip location. There are inlet openings 48 positioned at the lower side of the end edge of the wing, and the high pressure air flows into these openings 48 and into passageways where it is discharged through slots 46 in the upper surface of the wing.

U.S. Pat. No. 3,936,013 (Yuan) relates to the problem of alleviating the problem of vortices at the wing tip locations. At the tip of the wing there is a tubular member 21 which projects laterally outwardly from the end of the wing into the air stream, and there are orifices 22 which blow air into the flow of air in the vortex. In FIG. 3, the flow of the vortex air is illustrated at 24, flowing in an upward direction, and the downward fluid jets 25 that are ejected from the tubular member 21 are indicated at 25.

U.S. Pat. No. 3,881,669 (Lessen) relates to the problem of alleviating the formation of vortices at the outer edge of the outer tip of the wings. This arrangement consists of injecting into the core of the trailing vortex a fluid stream. It is stated in column 3, line 15, that it is essential that the axis of the injected stream be substantially co-linear and co-axial with the longitudinal axis of the trailing vortex.

U.S. Pat. No. 3,841,587 (Freed) relates to the problem of alleviating vortices at the wing tips. There is positioned at the tip of each wing a nozzle assembly 26 that is positioned at the outer trailing edge of the wing and discharges air rearwardly into the core of the vortex. Air is bled from the jet engines to provide the pressurized air. This is a convergent-divergent (i.e. Venturi type) nozzle so that the air in the nozzle reaches sonic velocity at the throat so that the velocity increases to maximum super sonic level in the divergent section of the nozzle from which the air expands outwardly. The nozzle is arranged so that the exhaust passages may be in a configuration to create a new vertical flow of the air in a counter rotating direction relative to the vortex forming at the wing tip. There is a transition from the supersonic back to the subsonic velocity producing a shock wave with an abrupt change in temperature and rapid increase in density of the air in the vortex forming region. It is stated that effects either arrest of the vortex or causes early decay.

U.S. Pat. No. 3,596,854 (Haney Jr.) relates to affecting the vortex developing at the wing tips, primarily for the reason of better aerodynamic control of the airplane. There is at the tip of the wing a housing 10 having a generally cylindrical chamber 11 closed at the front and a discharge orifice 12 at the rear. This causes the air to rotate or swirl in the chamber. This to be done in a manner to increase or decrease lift.

U.S. Pat. No. 3,012,740 (Wagner) relates to an aircraft boundary layer control system where high pressure air is tapped from the engine and is discharged along the wing for improved boundary layer control.

U.S. Pat. No. 2,650,781 (Taylor) shows a system for accomplishing boundary layer control. It is stated that the vortex that is formed at the tip of the wing creates a low pressure area within the core of the vortex. There is an elongated slot 20 at the upper surface of the wing, and this is attached by a duct which leads to the opening at the rear tip portion of the wing. Thus, the air is sucked through the slot to go through this tube and be ejected into the vortex as a means of providing for boundary layer control.

U.S. Pat. No. 3,845,918 (White Jr.) shows a "vortex dissipater" which comprises a fixed flat plate which is mounted at the tip of the wing and is aligned in the direction of the free stream. The plate extends forward from the trailing edge of the tip and outward from the suction side of the lifting surface far enough to reach to the maximum rotational velocity of the vortex.

U.S. Pat. No. 5,150,859 (Ransick) shows an arrangement where a turbine is placed at the wing tip and the trailing vortex that is induced at the wing tip so that the vortex drives the propeller blades which in turn supplies power to such things as the wing de-icing system, etc.

U.S. Pat. No. 5,492,289 (Nosenchuck et al) discloses a "lifting body with reduced-strength trailing vortices." The trailing edge of the wing is formed with a varying chord length near the tip of the wing, as shown in FIG. 7A where there is a "perturbation" which protrudes rearwardly at 105 at the location of the tip end 102.

U.S. Pat. No. 5,634,613 (McCarthy) shows a wing configuration to alleviate the problems of generating the vortex at the end of the wing by contouring the outer end portion of the wing in a manner to create a "beneficial vortex". For example, in FIG. 2, which is a view looking straight towards the leading edge of the wing, there is a twist in the forward to rear direction at 66 which gradually changes the airfoil's actual angle of attack from a position angle of attack 68 near the root to a negative angle of attack at the location 70.

U.S. Pat. No. 5,918,835 (Gerhardt) discloses a wingtip vortex device installed at the wingtip of the aircraft, this device having radial fins which are positioned at the location of the vortex so these are caused to rotate by the vortex that shed from the wingtip.

U.S. Pat. No. 6,082,679 (Crouch et al) discloses a system for destruction of trailing vortices, this being accomplished by actuating the control surfaces at the trailing edge of the airfoil in the manner to result in accelerated breakup of the trailing vortices.

U.S. Pat. No. 6,394,397 (Ngo et al), Company, discloses a means of dissipating the vortex by providing an outer edge portion of the wing with a sliding tip member 28 that has a position where it is aligned with the main wing, and a second position where it is moved downwardly from the main wing to extend into the pressure side surface 24 to dissipate the vortex.

U.S. Pat. No. 6,422,518 (Stuff et al), disclose an aircraft with means for breaking down the wing tip vortices, this being accomplished by placing winglets at various locations on the airplane, such as at the fuselage behind the wings, at the tips of the tail in the horizontal plane, or at landing flaps at the inside edges at the wings.

U.S. Pat. No. 6,513,761 (Huenecke), shows a system for reducing vortices in the wake of the aircraft by generating a counteracting vortex or vortices to cause the trailing vortex to "vibrate". The vibrations of the trailing vortex preferably extend perpendicular to a central longitudinal aircraft axis. Several versions of this are shown in FIGS. 7, 8 and 9. It is indicated in column 6, line 6 that the vortex generators 9 and 10 are preferably auxiliary flaps that are so positioned that the respective counter vortices 13 and 14 interfere with the formation of flap vortices 11B and 12B.

BRIEF DESCRIPTION OF THE DRAWINGS

FIGS. 9A, 9B, 9C-1, 9C2, 9D-1, 9D-2 illustrating the vortex that is shed from the wingtip in situations without activation of the vortex dissipating apparatus and with the activation of the vortex dissipating apparatus where the frequency of the cyclic movement of the direction of the jet air stream is at 10.7 Hz;

DESCRIPTION OF THE EMBODIMENTS OF THE INVENTION

Figure 1:
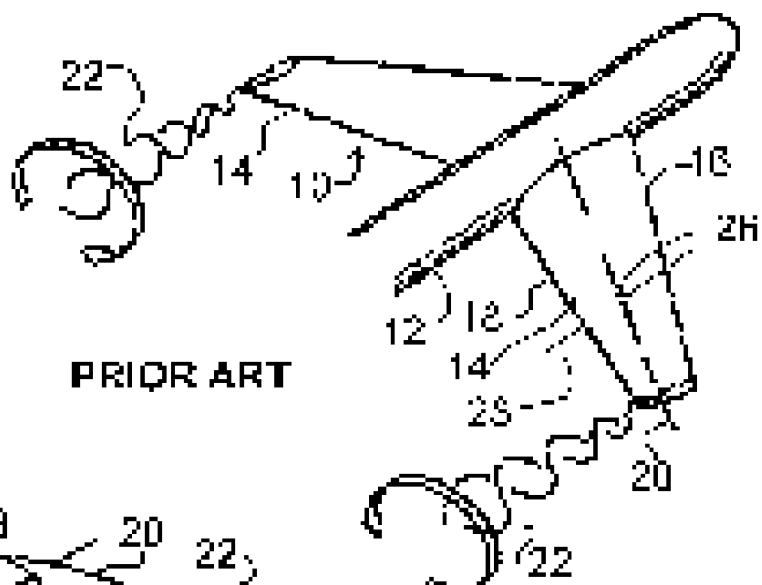
FIG. 1 is an isometric view showing an airplane shedding a vortex at each wingtip location.

The embodiments of the present invention comprise an airfoil vortex dissipating system and a method relating to the same. The airfoil in which the system is incorporated has a leading edge, a trailing edge, an outer edge portion, an upper aerodynamic surface, a lower aerodynamic surface, a spanwise axis, a forward to rear chord axis, and an alignment reference plane coincident with the spanwise axis and the chord axis. The airfoil is characterized in that when the airfoil is functioning to create aerodynamic lift, a vortex is created at the outer end portion of the airfoil. The airfoil has a vortex core axis, a main circumferential flow region and an outer perimeter flow region.

The vortex dissipating apparatus comprises a nozzle section which is at or proximate to the outer end portion of the airfoil, and has a nozzle discharge portion which in this embodiment is at an alignment location extending generally in a forward to rearward direction at, or proximate to, the outer end portion of the airfoil. The nozzle section is arranged to discharge a jet stream into the vortex.

In one embodiment, the jet stream is discharged in a lateral discharge direction having a substantial discharge alignment component generally perpendicular to the chord axis and parallel to the alignment plane.

There is a pressurized air inlet section to supply pressurized air to the nozzle section with the pressurized air being discharged from the nozzle section.

In embodiments of the present invention, the nozzle discharge portion is arranged to be actuated to move the lateral discharge direction back and forth, and in embodiments shown herein upwardly and downwardly between upper and lower end locations in a cyclical manner. In at least one embodiment, the lateral discharge direction of the jet stream moves in cycles rotatably through an angle of at least as great as about one third of a right angle, or through an angle at least as great as about two thirds of a right angle or more.

In an embodiment, the nozzle discharge is arranged so that when the lateral discharge direction is at a generally central location between the upper and lower locations, the nozzle discharge portion is discharging the jet air stream so that the lateral discharge direction has a substantial alignment component generally perpendicular to the chord axis and generally parallel to the alignment reference plane.

In another embodiment, the nozzle discharge portion is arranged so that the lateral discharge direction is at a general central location between the upper and lower locations, and the nozzle discharge system is discharging the jet air stream so that the lateral discharge direction has a substantial alignment component slanting downwardly and outwardly from the referenced alignment plane.

In one mode of operation, the apparatus is arranged so that cyclic frequency of the back and forth movement of the discharge direction is sufficiently high so that dissipation of said vortex is accomplished by alleviating the intensity of the vortex. In different operating modes this cyclic frequency can be greater then 2 Hz, at least as great as 5 Hz, or as great as 10 Hz or greater.

In another mode of operation the vortex dissipating apparatus is arranged so that cyclic frequency of the back and forth movement of the lateral discharge direction is sufficiently low so that dissipation of the vortex is accomplished at least in part by accelerating instability which leads to vortex dissipation. This cyclic frequency can be at least as low as about 2 Hz, or as low as approximately 1 Hz or less.

Also, in yet another embodiment the nozzle discharge portion is arranged so as to have at least two nozzle discharge portions which discharge at least two jet air stream portions, with said jet air stream portions being moved cyclically back and forth in an out of phase relationship.

To describe these embodiments in more detail reference is made to FIG. 1, where there is shown somewhat schematically the forward portion of an airplane 10 having a fuselage 12 and right and left wings 14. Each wing 14 has a leading edge 16, a trailing edge 18 and an outer edge tip portion 20. As illustrated in FIG. 1, there is shed from each outer edge portion 20 a vortex, indicated schematically at 22, which can be described as being a mass of rapidly spinning air.

Figure 2:
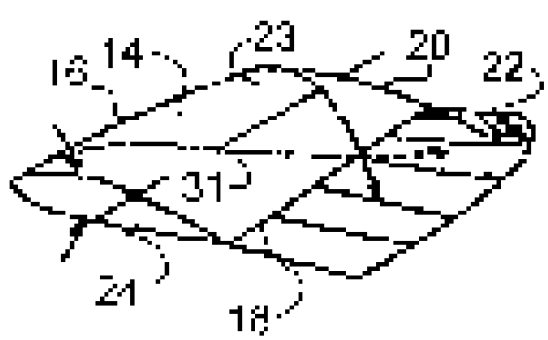
FIG. 2 is an isometric view of a section of an airfoil illustrating the flow pattern which results in the formation of the vortex.

To describe the manner in which a wing produces a vortex, reference is made to FIG. 2, which shows an outer section of the wing 14 having the leading and trailing edges 16 and 18 and the edge tip portion 20. The wing 14 has an upper aerodynamic surface 23, a lower aerodynamic surface 24, a spanwise axis 26 and a chord axis 28. For purposes of description, there will be designated an "alignment plane" which is generally horizontally aligned (with the airplane flying horizontally) and which is coincident with the spanwise axis 26 and the chord axis 28.

With further reference to FIG. 2, to describe briefly how the vortex 22 is formed in flight, there exists a pressure level differential between the upper and lower wing surfaces 23 and 24, and this results in a change in the direction (indicated at 31) of the spanwise velocity component across the surface of the trailing edge which separates the flow from above and from below the wing. This velocity gradient is the principal source of vorticity content with in the wake. The sheet of concentrated vorticity rolls up into two distinct counter-rotating vortex elements 22 that originate at the tips of the wing, as schematically shown in FIG. 1 and also indicated at 22 in FIG. 2.

Depending upon weather conditions, for large and heavy planes these vortices are quite intense and they can persist for a relatively long time, which translates into relatively large distances, relative to the residual effect along its flight path. For example, the trailing wake of a relatively large transport airplane during approach might pose a danger to an airplane following in its flight path for about 1.5 minutes which corresponds to about 20 km distance in the spacing of the airplane. In a quiet atmosphere the vortices persist very long until their destruction through molecular and turbulent dissipation. Usually however, the mechanism that leads to the eventual vortex break up due to atmospheric perturbations is flow instability (often referred to as Crow instability, Crow, S. C., "Stability Theory for a Pair of Trailing Vortices", AIAA Journal, Vol 8, No. 12. pp. 2172-2179, December 1970). The onset of instabilities is hastened by ambient turbulence, wind and atmospheric stratification. These sources of excitations trigger the generation of sinusoidal waves along the cores of the vortex elements. The subsequent process of nonlinear amplification results in the breakup of vortex elements and leads to their destruction. Relative to quiescent conditions, the perturbations due to atmospheric disturbances and the ensuing instabilities shorten the lifespan of the vortices. Unfortunately, these instabilities usually evolve rather slowly and do not result in flow conditions that allow practical reductions in airplane separation.

During take-off and landing, high-lift devices are deployed and the trailing wake consists of multiple vortex elements developed by these high lift devices. In those configurations, the dynamics of the individual vortices are more complex, but the destabilization caused by atmospheric disturbances is still the leading mechanism of vortex decay.

The trailing vortices generated by large aircraft can be a severe atmospheric disturbance to airplanes that are flying into their path. This situation is especially acute during take-off and landing since the flight segments are formed in a relatively narrow corridor. Moreover, the swirling flow of the vortex 22 is very intense at low speed.

Figure 3:
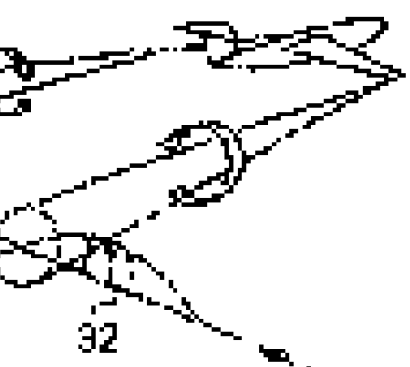
FIG. 3 is a somewhat schematic isometric view illustrating schematically the flow pattern of vortices generated and the effect of the these on other aircraft.

These swirling flow patterns are illustrated somewhat schematically in FIG. 3, and it should be understood that FIG. 3 is not intended to be an accurate representation of the airflow associated with the vortex, but rather to show the overall pattern. It can be seen that at the outside portion of the vortex there is an up wash 32 and at the inside of the vortex there is a down wash 34. It can be seen that for an airplane 36 traveling between the two down wash zones 34, there is a loss of altitude (when landing) or a loss of rate of climb. For the airplane indicated at 38 that is traveling into the up wash 32, there can be imposed a roll moment on the airplane. For the airplane indicated at 40, moving transversely through the two vortices 22, there can be imposed substantial aerodynamic stresses on the airplane 40 by the sudden change in vertically oriented loads imposed on the airplane 40.

Figure 4:
FIG. 4 is a cross sectional view of a typical vortex.

To facilitate the description of various aspects of these embodiments of the invention, the vortex that is generated from the wingtip is shown schematically in cross-section in FIG. 4, and shall be considered as having a vortex core 44, a main vortex flow region 46 surrounding the core, and an outer perimeter flow region 48 surrounding the main vortex flow region 46. Obviously, there are no sharp lines of demarcation between the vortex core 44, the main vortex flow region 46, and the perimeter flow region 48.

With the foregoing text being given as background information, there will now be a description of the embodiments of the invention. In the following description "the term airfoil" is meant to refer to the entire aerodynamic body, and it is not intended to mean a cross section or cross sectional configuration of the same. Also within the broader scope, it is meant to include various aerodynamic bodies, including a wing, trailing edge flaps, leading edge flaps or slats, winglets, control surfaces, etc.

The airfoil vortex dissipating system 50 of this embodiment along with its nozzle section 52, will be described in more detail later in this text with reference to FIGS. 6, 7, and 8. However, it is believed that a better understanding of the system 50 will be obtained by first giving a preliminary description of the function of this vortex dissipating system 50, and this will be done with reference to FIGS. 5A through 5D.

Figure 5A:
FIG. 5A-5D are sequential views showing an air jet flow pattern of an embodiment of the present invention.

In FIG. 5A, there is shown the outer edge portion 20 of the right wing 14, and there is shown at 54 a nozzle alignment axis. At the location of that axis 54 there is a moveable coverplate or panel 56 which closes an air jet stream discharge opening, the perimeter boundary of which is indicated 58 in the FIG. 5A. There is also shown in FIG. 5A a lateral jet stream discharge axis 60 (hereinafter referred to as the lateral discharge direction 60) which has a substantial alignment component perpendicular to the nozzle alignment axis 54, and also has a substantial alignment component parallel to the aforementioned alignment plane which is defined by (and coincides with) the spanwise axis 28 and the chord axis 30. In the cruise mode of the airplane 10, the coverplate 56 would be in it's closing position, and would be opened when the airplane is either landing or taking off and climbing.

Figure 5B:
Figure 5C:

In FIG. 5B, there is shown the jet air stream 62 being discharged in a direction which is generally parallel to and also coincident with (or in proximity to) this lateral discharge direction 60. As indicated above, the discharge of the jet air stream 62 would normally occur only during the take-off or landing made. As will be disclosed in more detail later herein, the aforementioned nozzle section 52 can be operated so that the jet air stream 62 can be also discharged in a direction having an upward slant, as shown in FIG. 5C, and also a downward slant, as illustrated in 5D. Further, in the operating mode of this embodiment, the up-and-down movement between the positions of 5C and 5D can be done in different operating modes so that the jet air stream 62 rotates in up-and-down cycles at higher and lower frequencies. The effect of these is to contribute to the dissipation of the vortex 42, and this will be discussed in more detail later in this text.

Figure 6:
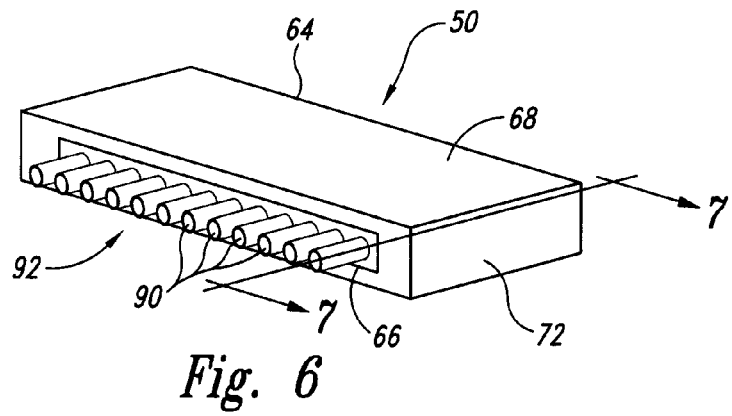
FIG. 6 is a somewhat schematic isometric view illustrating a nozzle section of an embodiment of the invention.
Figure 7:
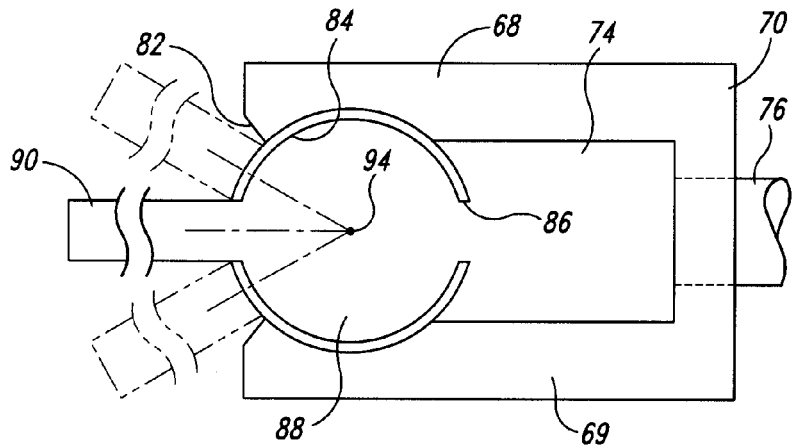
FIG. 7 is a sectional view taken along line 7-7 of FIG. 6.
Figure 8:
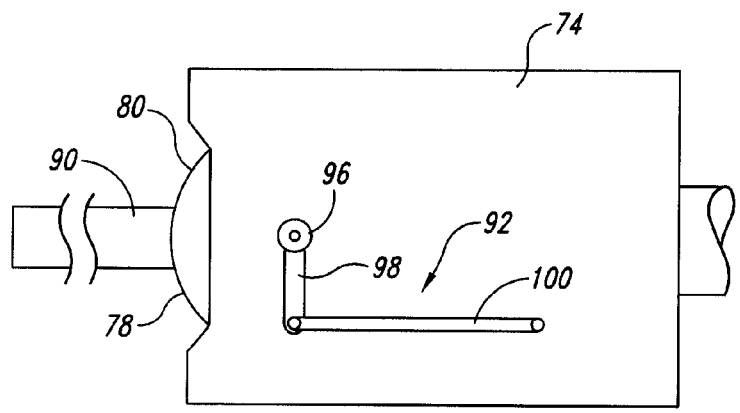
FIG. 8 is an end view of the nozzle section of FIG. 6.

Reference is now made to FIGS. 6, 7, and 8 to describe the nozzle discharge section 52 in more detail. It is to be understood that FIGS. 6, 7, and 8 are somewhat schematic and are not intended to show an optimized structural configuration design, but rather to show a design having components which would perform the basic functions. In the situation where this design were to be actually implemented as part of an aircraft, then each of the components would be configured to match the design goals of being lightweight, structurally sound, functional and to accomplish the pressurizing, containment, and discharge of the jet air stream 62, and also to properly fit in the contours of the wing or other airfoil.

In FIG. 6, there is shown the basic components of the nozzle section 52 which are a housing section 64 (hereinafter called the housing 64) and a nozzle discharge section 66. As shown herein, the housing 64 is as a single elongate housing having upper or lower walls 68 and 69, respectively, a back wall 70 and end walls 72 that collectively define a pressurized plenum chamber 74. This housing 64 is positioned within the outer end portion 20 of the wing 14, and accordingly it obviously would be contoured to fit properly within the confines of that portion of the wing 14.

There is a pressurized air inlet 76 which receives pressurized air from a suitable source. For example, the pressurized air could be bled from the compressor section of a jet engine or from some other source. Also, while the inlet 76 is shown is a single inlet, this could be arranged in manner of a manifold with multiple inlets or some other configuration.

The nozzle discharge section 66 has an overall elongate configuration and comprises a nozzle mounting member 78 which has the overall configuration of an elongate cylindrical wall 80, which fits snugly in an elongate forward end opening region 82 formed at the forward part of the housing 64. This end opening region 82 comprises two oppositely positioned cylindrically curved surfaces 84 which match the configuration of the cylindrical wall 80, with the curved surfaces 84 forming a substantially airtight seal with the cylindrical wall 80.

The elongate cylindrical wall 80 is closed at opposite ends, and has one or more rear openings 86 which open to the plenum chamber 74 of the housing 64 and open to a nozzle plenum chamber 88 that is defined by the cylindrical wall 80.

Located at the forward portion of the cylindrical wall 80 is a plurality of individual nozzle members 90, which collectively form a nozzle discharge portion 92 of the nozzle discharge section 66. These nozzle members 90 are shown in FIG. 6 to be aligned with one another at the lateral discharge axis 60, so that these collectively form the aforementioned jet air stream 62. Thus, when pressurized air is directed through the pressure air inlet or inlets 76 into the plenum chamber 74 and from there into the nozzle plenum chamber 88, the pressurized air is discharged through these nozzle members 90 to form this jet air stream 62.

The cylindrical wall 80 is rotatably mounted in the cylindrical curved surfaces 84 that define the elongate forward end opening region 82 of the housing 64, with the axis of rotation being indicated at 94. As shown in the broken lines of FIG. 7, this enables the nozzle members 90 to be moved from a middle alignment location where the nozzles 90 are directed horizontally upwardly or downwardly to the broken line positions shown in FIG. 7. In this embodiment, the amount of upward rotation could be, for example, one-third of a right triangle (e.g. about 30 degrees) and downwardly through that same angular rotation, so that the total path of travel could be, for example about 60 degrees.

To move the nozzle members 90 to their various positions of angular orientation, a suitable actuating mechanism can be provided, such as shown schematically in FIG. 8 at 92. The nozzle mounting member 78 connects to a shaft 96 that connects to a lever arm 98 that is in turn moved by an actuating arm 100. Obviously, various devices could be used to change the position of the nozzle mounting member 78, such as a bell crank, a gear drive, or an electric, pneumatic, or hydraulic positioning device, etc. but since these various design options would be well-known to those skilled in the art, these will not be listed herein.

Also, there could be various arrangements to direct the pressurized air to the nozzle members 90. For example, the pressurized air inlet 76 could be connected directly to the nozzle mounting member 78, leading through the cylindrical wall 80, or possibly being attached by a rotary fitting to an end wall of the cylindrical mounting member 78. This arrangement would eliminate the present configuration of the housing 64 having the plenum chamber 74. With the constraints of having the nozzle assembly 50 being positioned on the outer edge portion 20 of the wing, it may be more desirable to have the housing 64 in a configuration which would be compatible with these space restraints and also provide a plenum chamber of sufficient volume to give the proper pattern of pressurized air discharge through the nozzle members 90.

With regard to the positioning of the nozzle assembly 52, the housing 64 and the nozzle mounting member 78 may be at a fixed location in the outer edge portion 20 of the wing 14. In this instance, when the vortex dissipating system 50 is to become operational, the aforementioned coverplate 56 is moved away from the air jet stream discharge opening 58 so that the nozzle members 90 are able to direct the air jet stream 62 through the opening 58 so that the jet air stream 62 is discharged into the vortex 42.

The coverplate or panel 56 can be moved from its covering position to an open position in various ways. For an example, this coverplate 56 could have a curved configuration and be movable so that it will slide out of the opening region and into a stowed position.

In airfoils such as the wings of the airplane, the outer end portion has in plan view, a moderate forward to rear outward curve so that at the mid-length of the curved outline of the end tip of the wing is positioned a short distance further outwardly from the fuselage. To place the nozzle members 90 relatively close to outer edge portion of the wing or other airfoil, the alignment position of the nozzle members 90 would be in a moderate curve. Therefore, the configuration shown in FIG. 6 could be modified to place these nozzle members 90 in a curve matching that of the outer edge of the wing or other airfoil, and yet be able to rotate upwardly and downwardly. To obtain this configuration, there are various options. For example, instead of making the nozzle mounting member 78 as a single structure extending the entire length of the housing 64, the nozzle mounting member 78 could be arranged in a plurality of individual segments which can be rotated about slightly different axes of rotation 64 so that these would match the outer curvature of the line of the wingtip more closely. Other arrangements would be available, and since these are well-known with those skilled in the art, these will not be elaborated on in this text.

As indicated earlier, when the airplane 12 is in the cruise mode the vortex dissipating system 50 is not used and remains concealed behind the coverplate 56 in the wing. Then the coverplate 56 would be moved to the open position and the vortex dissipating system 50 would generally be used in the takeoff and landing mode when it is highly desirable to hasten the decay of the two wingtip vortices With the jet air stream 62 being injected into the vortex 22 at this location and at the orientation and direction as described above, the entry of the jet air stream 62 into the vortex is at a location at which the core of the vortex is forming, with the laterally outward and upward curved vortex flow of the air from the lower surface of the airfoil taking place around the core of the vortex that is forming. The analysis done thus far indicates that the entry of the jet air stream 62 at this location is particularly effective in affecting the air flow in the developing vortex so that the overall effect is to begin the dissipation at a critical location so as to cause substantial hastening of the decay of the vortex.

Beyond this, there is, as described with reference to FIGS. 5A-5D the mode of operation where the nozzle mounting member 78 is rotated cyclically up and down so that the nozzle members 90 move to the upper position shown in FIG. 5C and then through the intermediate position of 5B down to the lower position of 5D and back up would lead to the position of 5C in continuous cycles.

The results achieved by this embodiment of the invention were analyzed by Computational Fluid Dynamics procedure for simulation operation of the embodiment. The effectiveness of the operation was evaluated for a wing mounted on a vertical wall with a free stream Mach number of 0.25 at an angle of attack at eight degrees, so as to represent final approach conditions. This mode of operation results in a coherent wake with strong tip vortices. It was found that when this embodiment of the present invention as described above is utilized, the flow is affected in a manner that the vortex is significantly diffused.

In the case where the nozzles 90 are moved together up and down in the range of 30 degrees above and 30 degrees below the nozzle alignment axis 74, at a frequency of 10.7 Hz (one cycle in 0.093 seconds), the effect on the vortex is represented by the streakline traces of the wing tip as illustrated in FIGS. 9A, 9B, 9C-1, 9C-2, 9D-1 and 9D-2. In FIGS. 9A, 9C-1 and 9C-2, there is no ejection of the jet air stream 62 into the vortex, and FIGS. 9B, 9D-1 and 9D-2 represent the vortex with the ejection of the jet air stream 62 in the up and down sixty degree motion at 10.7 Hz. These "snapshots" demonstrate that the intermittent mixing provided by the cyclic motion of the jet perturbs the flow in the tip region and alters the development of the trailing vortex by reducing the strength and diffusing it in the cross plane.

There are several measures that can be used to track vertical activity. The far field wake structure is presented in FIGS. 10A, 10B, and 10C, where the tip vortex is tracked by the total-pressure loss, the cross-flow and the streamwise component of the velocity. The vortex core is represented by iso-surfaces of the respective flow properties with the clear indication that the strength of the vortex is significantly reduced due to the moving jet.

Figure 11A:
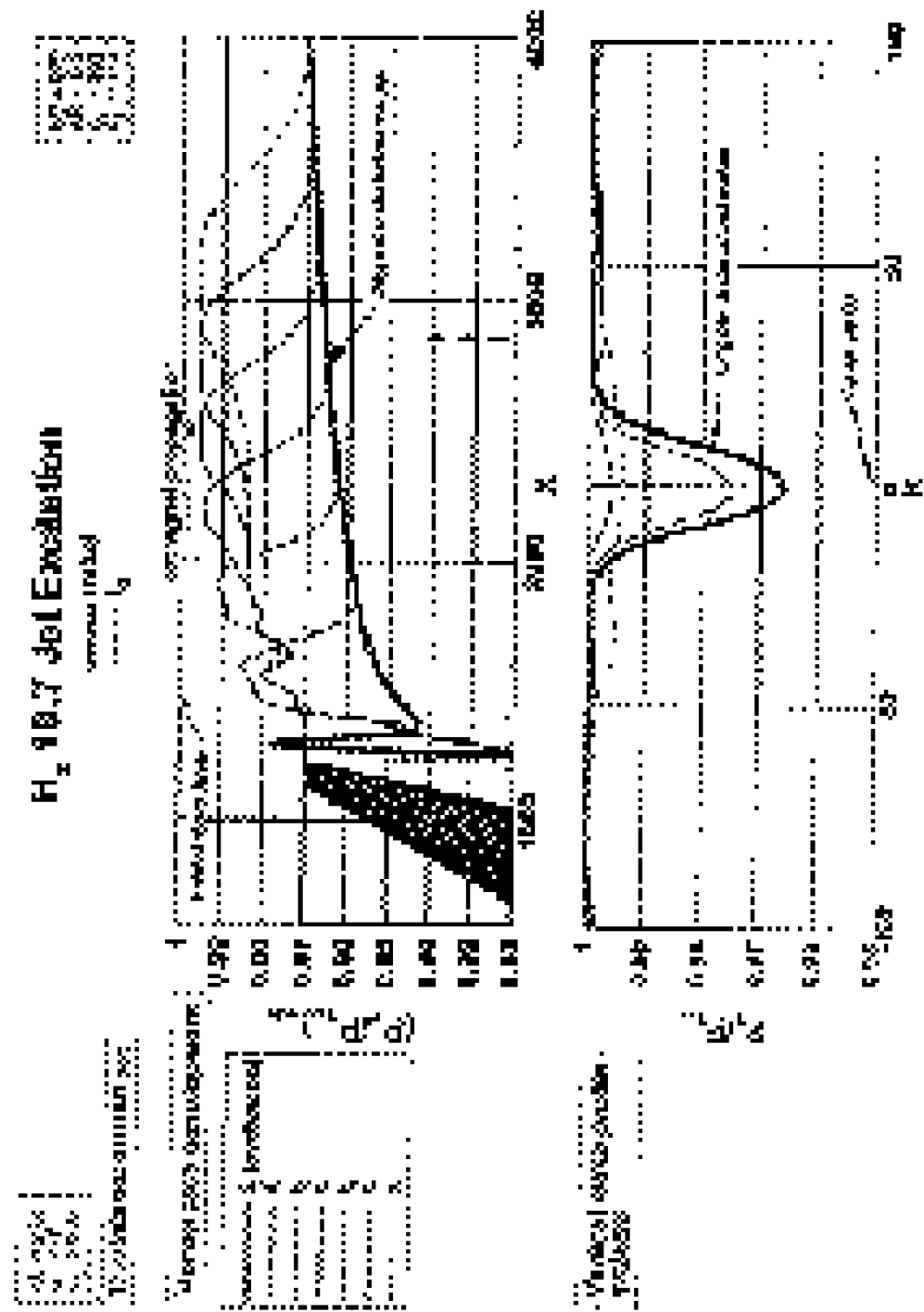
FIGS. 11A, 11B, and 11C are graphs presenting the development and dissipation of the vortex at the operating frequency of 10.7 Hz.
Figure 11B:
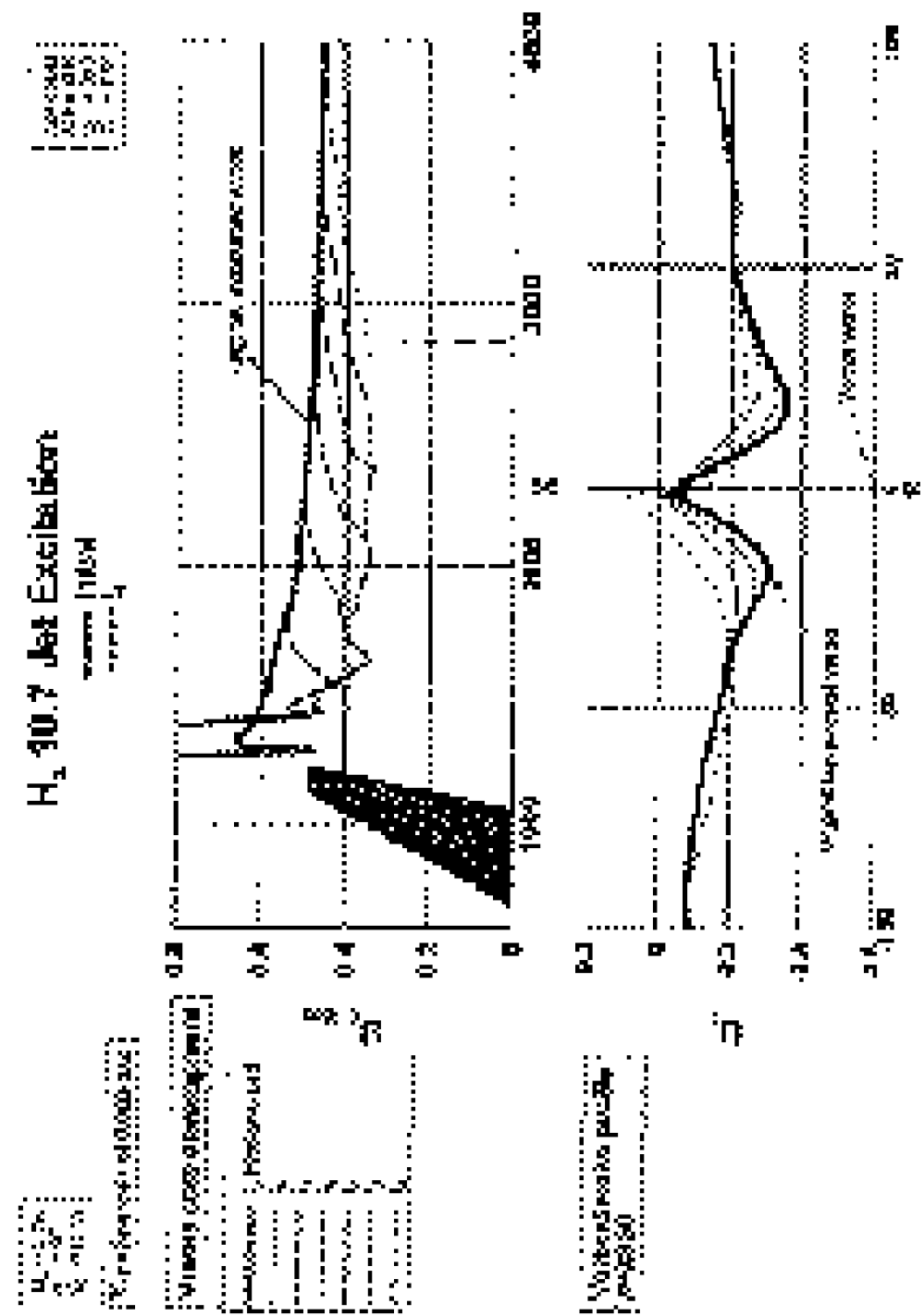
Figure 11C:
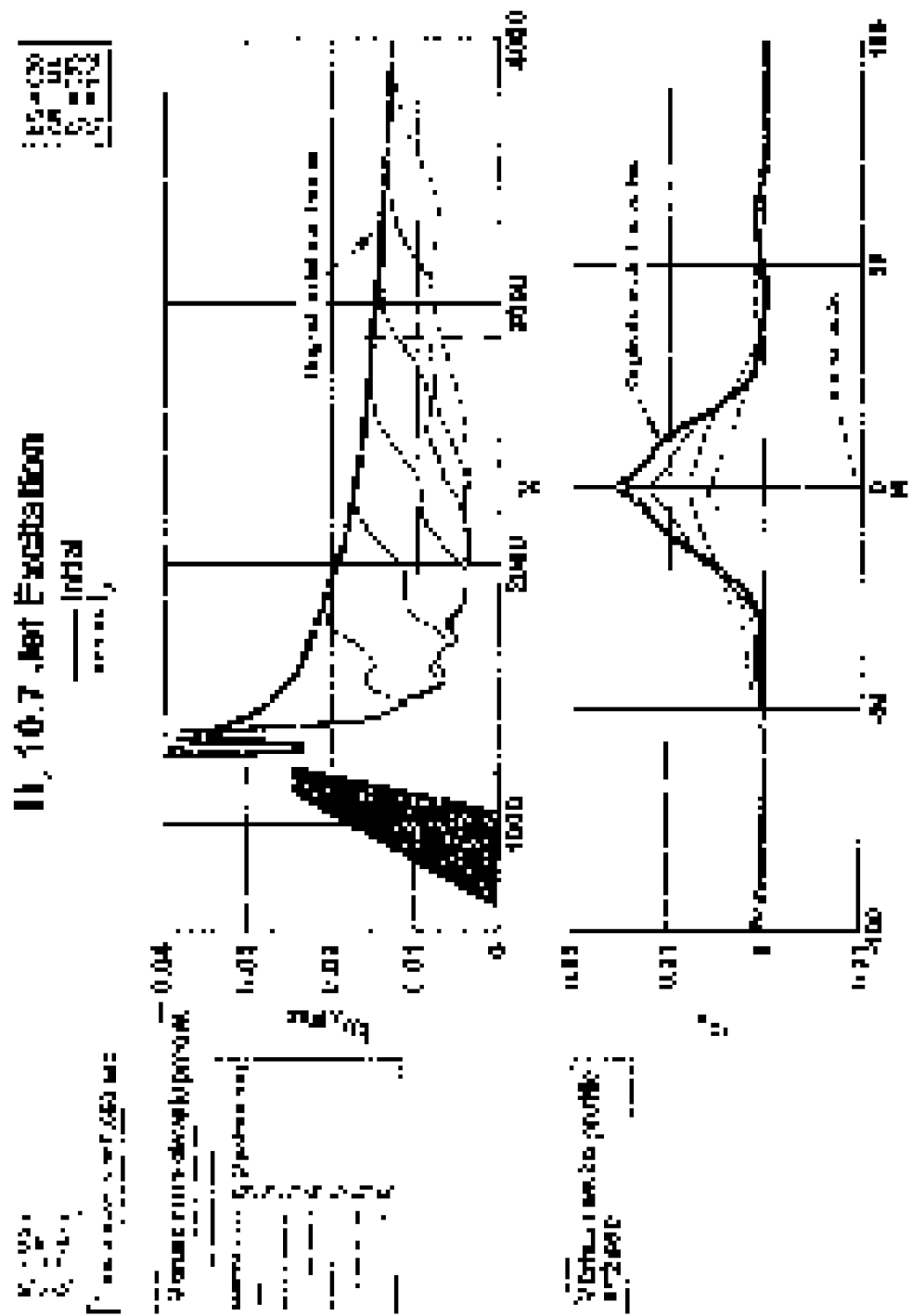

Diagnostics of flow development along the vortex at a frequency of 10.7 Hz core is shown in FIGS. 11A, 11B and 11C. Flow properties at a sequence of time intervals of 0.093 seconds from the instance of jet activation are shown along the vortex core in the upper plots. Also, the characteristics along a vertical line which passes through the vortex core at x=2850 are shown in the lower plots. The undisturbed vortex is described by the thick solid curves. The other curves represent the impact of the control mechanism on vortex characteristics at progressive time intervals with the signal traveling downstream (in the positive x direction). The front of the perturbation wave corresponds to the last snapshot in the time sequences and it is represented by the dashed curve. The dashed line describes the state of the vortex at 0.558 seconds from the start of jet application. The results indicate that the active system is very effective in reducing vortex strength as measured by the total-pressure loss, the cross-flow velocity (represented by the tangential component of the velocity) and the streamwise component of the vorticity.

Figure 12A:
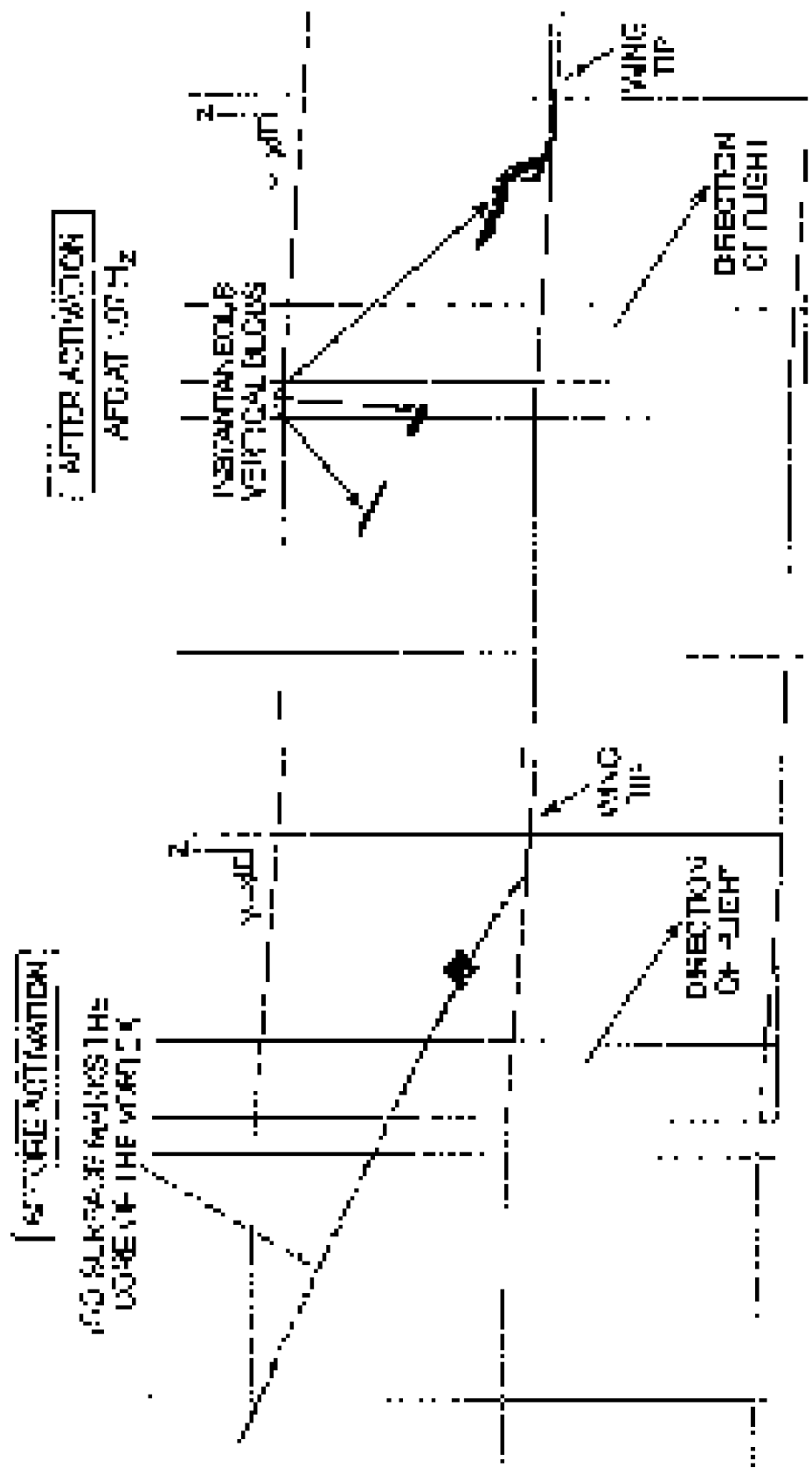
FIGS. 12A, 12B, and 12C are iso-surface representations similar to FIGS. 10A, 10B, and 10C, except that the operating frequency is 1.07 Hz.
Figure 12B:
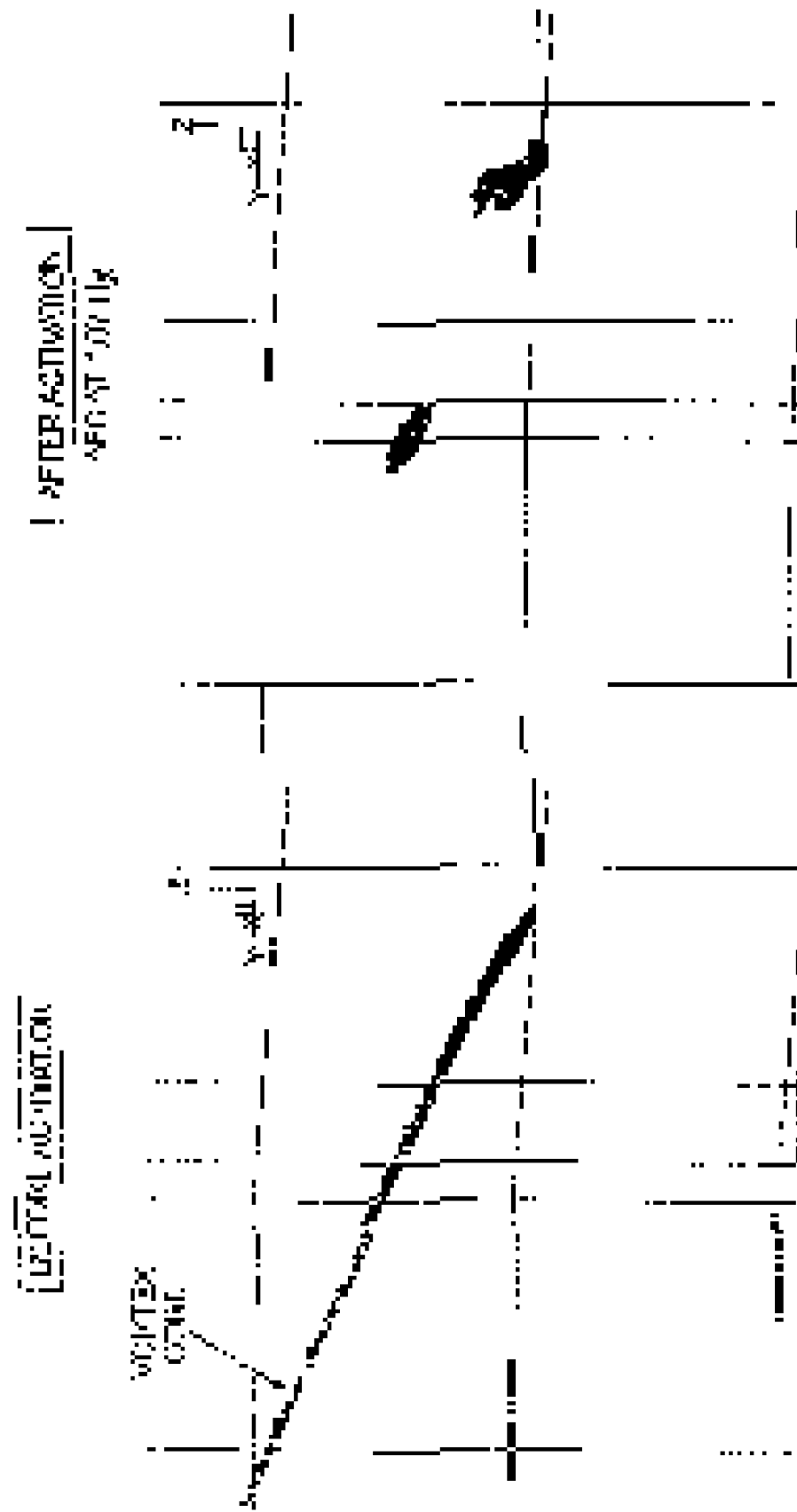
Figure 12C:
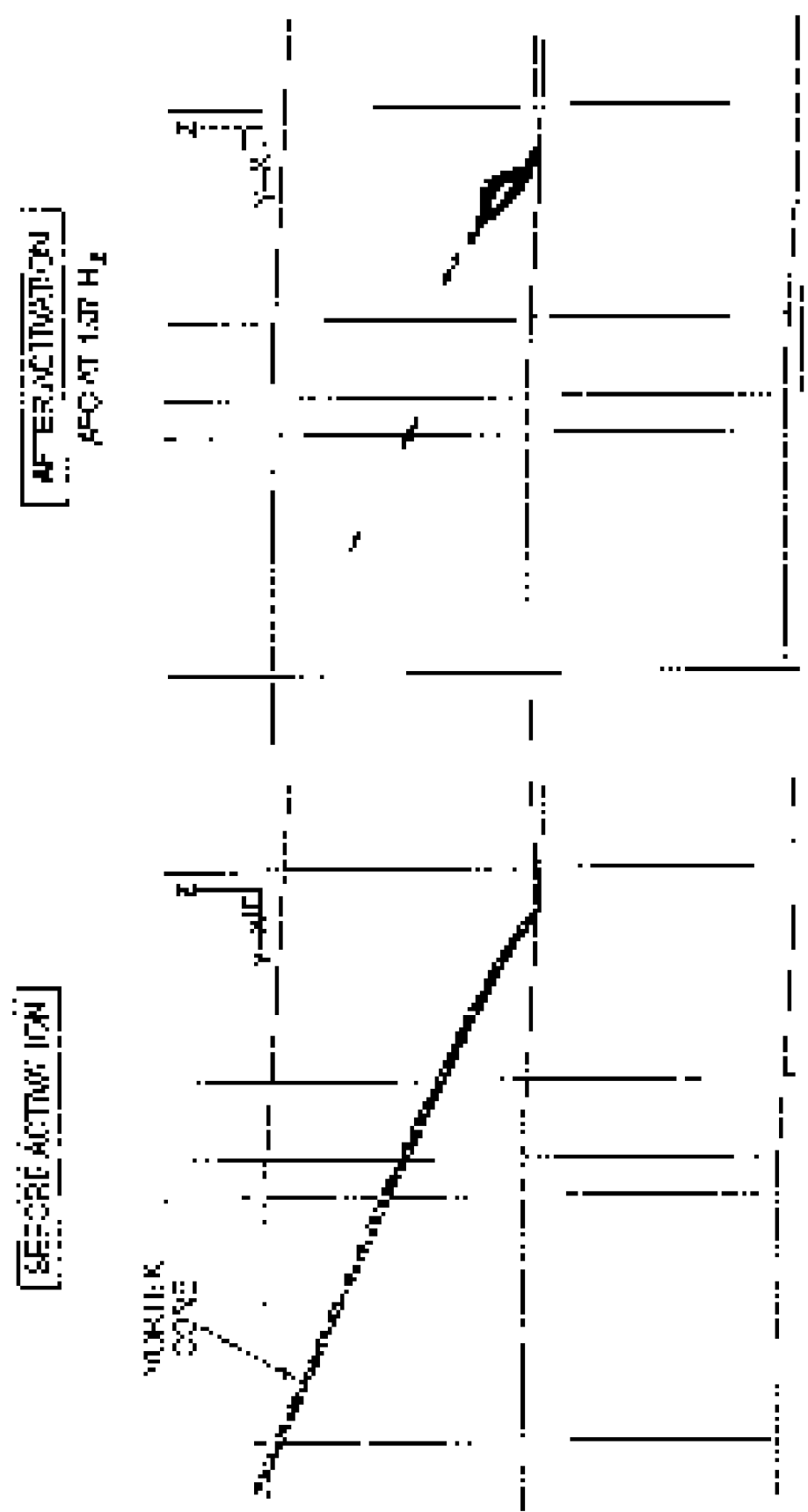

The up-and-down cycles of the nozzles 90 can also be effectively used at a lower frequency, such as approximately 1 Hz (i.e. one cycle of up-and-down motion in a little less than one second). The effect of this was analyzed by comparing the undisturbed vortex and comparing this with operating the vortex dissipating apparatus of the present invention at the 1.07 Hz frequency. The results of operating at 1.07 Hz are shown in FIGS. 12A, 12B, and 12C, which show that the oscillating jet air stream 62 introduces periodic disturbances along the vortex which propagate downstream. This continuous excitation results in the instability and destruction of the individual vortex segment.

Figure 13A:
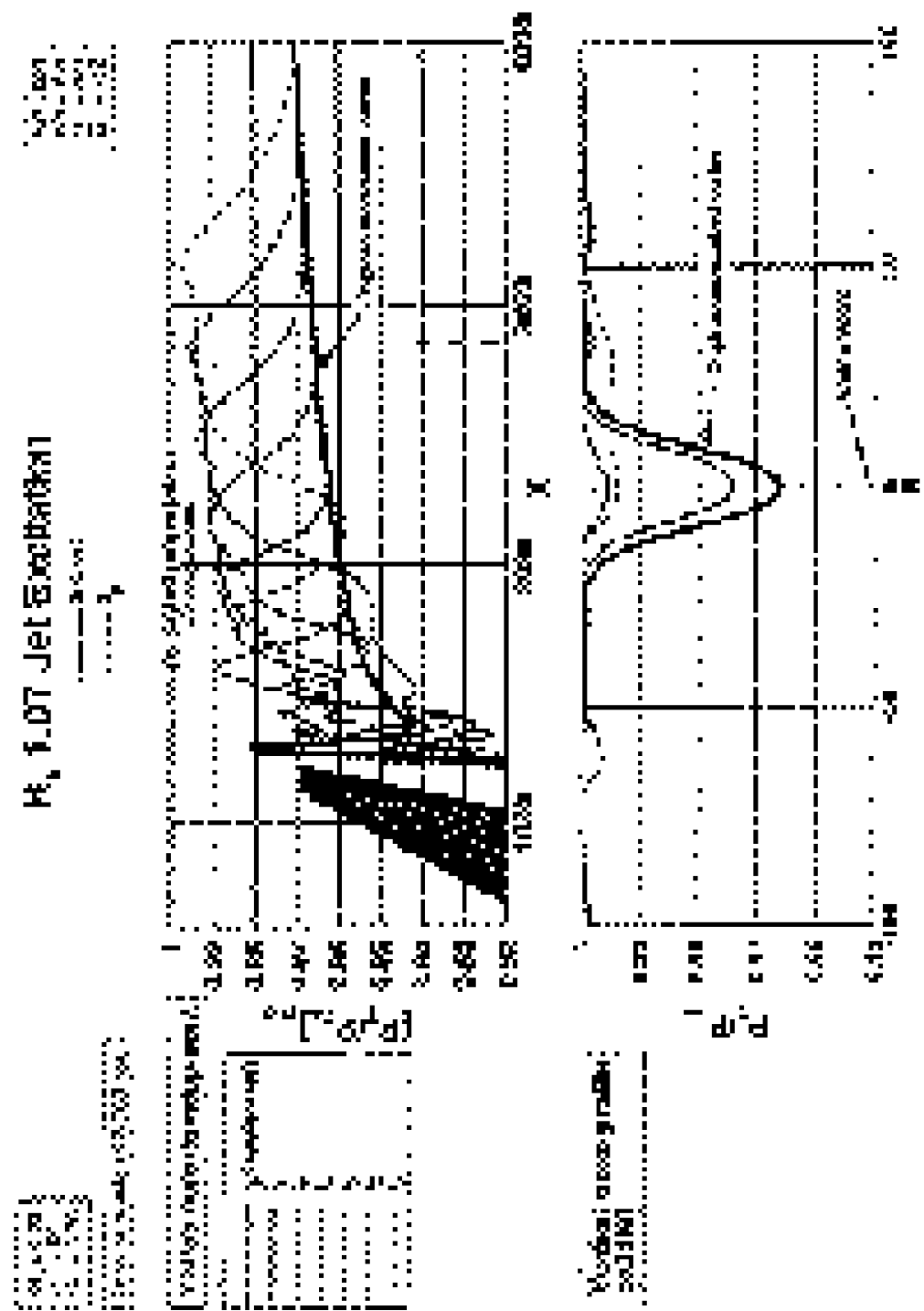
FIGS. 13A, 13B, and 13C are graphs similar to FIGS. 11A, 11B, and 11C, with the apparatus operating at a frequency of 1.07 Hz.
Figure 13B:
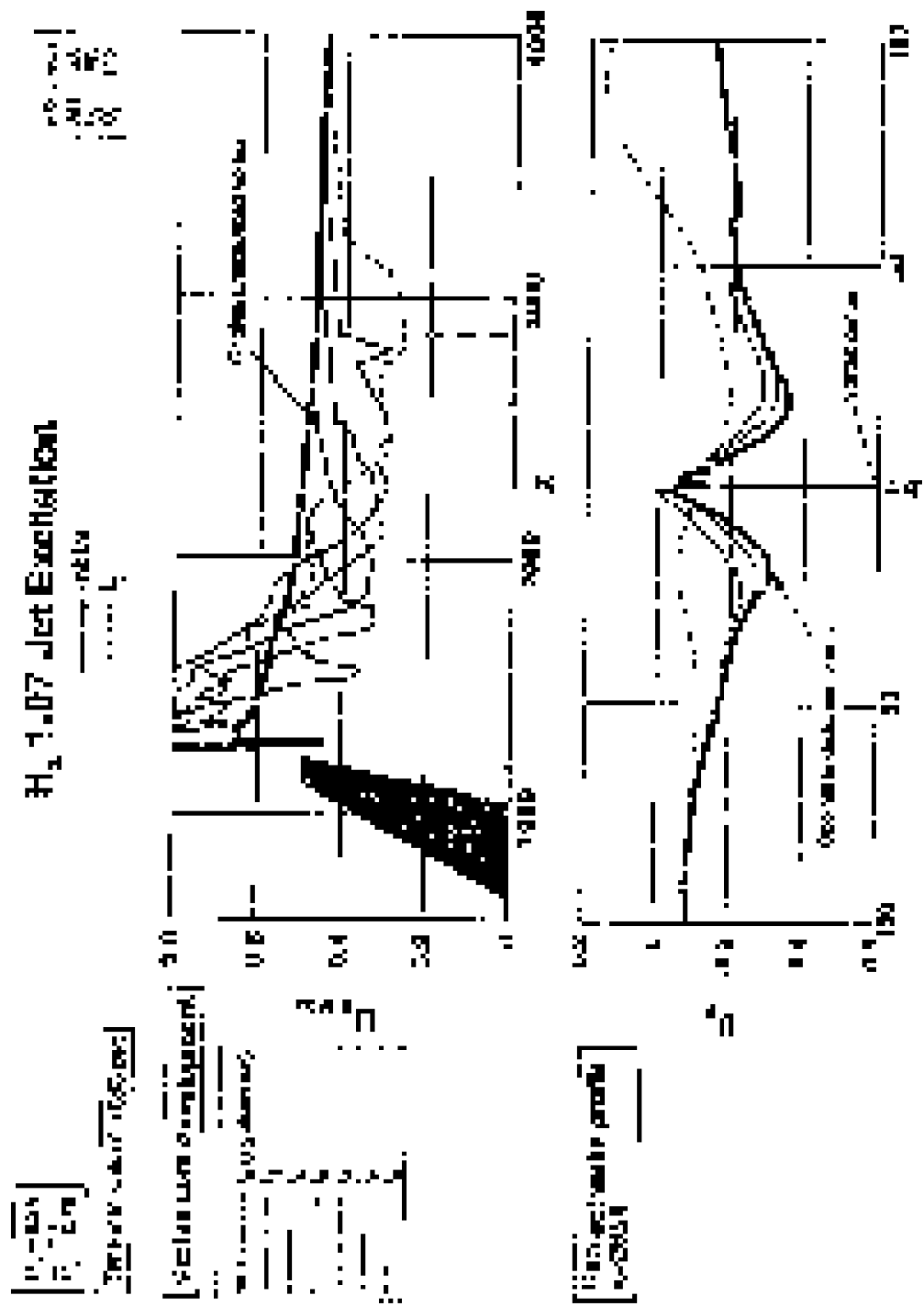
Figure 13C:
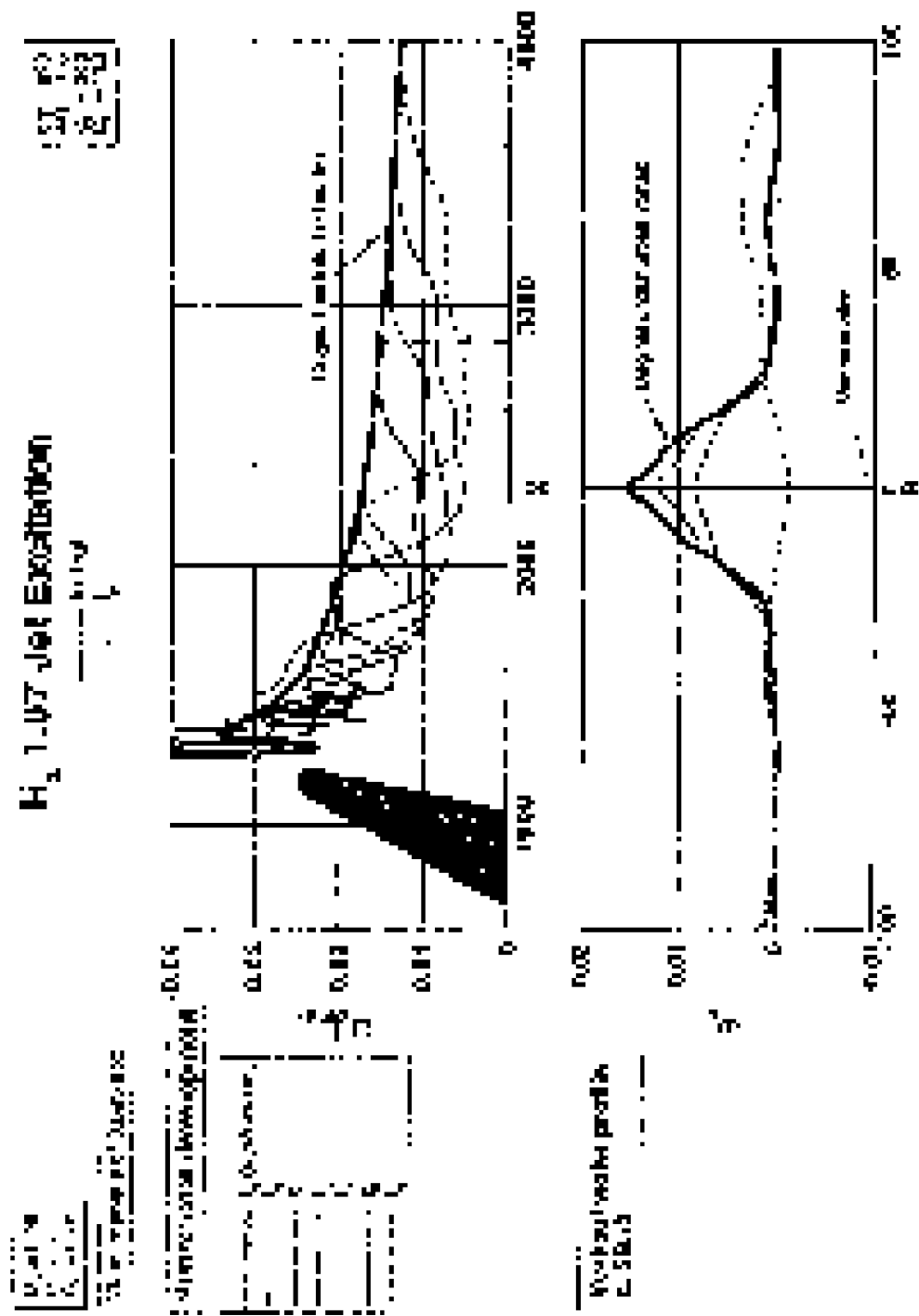

FIGS. 13A, 13B and 13C describe the perturbation wave along the vortex filament at various time intervals from the start of the jet application. It is shown that periodically, the total-pressure loss is reduced to less than 0.5%, which translates to about 85% reduction in the original vortex strength. The maximum tangential velocity is periodically reduced to about 50% of the original undisturbed vortex. Similarly, the maximum vorticity is being reduced by about two thirds. In practical terms, considering the substantial reduction in cross flow realized by using active control, a following aircraft will experience a bumpy flight but it will not be subject to a hazardous rolling motion.

Figure 5D:

Reference is now made to FIGS. 14A, 14B, 14C, 14D and 14E. These are sequential views which illustrate a similar method as shown in FIGS. 5B, 5C and 5D, but with some differences. In this instance, the jet nozzles 90 are separated into forward and rear sections, with each forward and rear section being able to move upwardly and downwardly in a pattern different from the other set of nozzles 90.

Figure 14A:
FIGS. 14A, 14B, 14C, 14D, and 14E are sequential views similar to FIGS. 5A-5D, but showing a further embodiment of the present invention where the jet air stream has two jet air stream sections which move back and forth in out of phase relationship.
Figure 14B:

In FIG. 14A, there is shown a forward set of jet air stream portions 60a and a rear set of jet air stream portions 60b. Both of these are the same position as shown in FIG. 14A. As shown in FIG. 14B, the forward set 60a has moved downwardly 30 degrees, while the rear set 60b has moved upwardly 30 degrees. Then in 14C, the two sections of jet air stream portions 60a and 60b have reversed their direction of orientation and are moving more toward the horizontal position and in FIG. 14C and moving through the horizontal position but still rotating in opposite directions. As shown in FIG. 14D, they have moved to the position where the forward jet air stream portion 60a has moved upwardly 30 degrees, and the rear jet air stream portion 60b has moved downwardly 30 degrees. Then as shown in FIG. 14E, the two jet air stream portions 60a and 60b are moving at a reverse direction and are passing through the horizontal position at the same time, but traveling in opposite directions.

Thus, this air jet stream oscillation forms which can be termed a scissors pattern.

Also, the angular orientation of the air jet stream can be shifted angularly from that shown in FIGS. 5A-5D. Instead of having the middle position be horizontal (i.e. parallel with the reference plane of the airfoil, the neutral position is slanted outwardly and downwardly at 30 degrees. Thus, in moving upwardly to the upper location, the jet air stream would be horizontal and in rotating to the lower position, the air jet stream would be slanting downwardly and outwardly at an angle of 60 degrees from the horizontal. It has been found that in this mode of operation, quite satisfactory results have been accomplished.

In at least some of the embodiments of the present invention, the nozzle section is positioned at an alignment location extending in generally a forward to rear direction at, or proximate to, the outer end portion of the airfoil. A length dimension of the region of where the air jet stream is discharged can be, for example, one third of a distance of chord length at the outer tip end portion of the airfoil, and in a broader range between approximately one quarter to one half of the chord length. However, within the broader scope of the present invention, this could be increased to, for example, 60%, 70%, 80%, 90% or 100% of the chord length, or it could be 35%, 30%, 25%, 20%, or conceivably 15% of the chord length at the outer tip of the airfoil.

The velocity of the jet air stream as discharged from the nozzle members 90 could be, for example, about Mach 0.62. However, depending upon other various factors, this could increase values up to Mach 0.7, 0.8, 0.9, or possibly greater. Also this could be decreased, for example, to Mach 0.6, 0.5, 0.4, 0.3, or possibly lower.

Also, the jet air stream with its back and forth motion could, within the broader scope of the embodiments be directed at different angular orientations and moved back and forth through different angular orientations and/or directed into other locations of the air flow forming the vortex.

In one arrangement of the vortex discharge portion 52 of the nozzle section 50, there is a plurality of nozzle members positioned along the alignment location. Each of the nozzles may be, for example, a simple conversion nozzle or a convergent/divergent nozzle if higher velocities are required. The cross section of the nozzle can be circular or other suitable shape. The shape of the cross section of the nozzle can vary along nozzle length (for example, it can vary from a circular section to an elliptical section at the nozzle exit). The nozzle and distribution ducting downstream of the actuation system should be designed to minimize pressure losses, using techniques well known to those skilled in the art. However, within the broader scope of these embodiments, there could be a more elongate nozzle discharge portion more in the form of a continuous slot or slots having a greater length dimension than width dimension.

In one proposed embodiment, the system is designed for a 600,000 pound airplane. In one design the calculated design parameters are as follows. The total chord wise length of the nozzle section is 43 inches, and it has 13 evenly spaced circular discharge orifices, each having a diameter of 3.2 inches. The velocity of the air that is discharged as the jet air stream is discharged at Mach 0.62.

In another design, for the same 600,000 pound airplane and with the discharge velocity being at Mach 0.62, the total length of the nozzle discharge section is 35 inches, and there are nine nozzle members each having an inside diameter of the discharge orifice of 3.9 inches.

In yet a third design, with the same airplane weight and air jet discharge Mach number, the total length dimension of the nozzle discharge section is 37 inches, and there are ten nozzle members, each having an inside diameter of the discharge orifice of 3.7 inches.

It is evident that various modifications could be made within the broader scope of the present invention as defined in the claims.

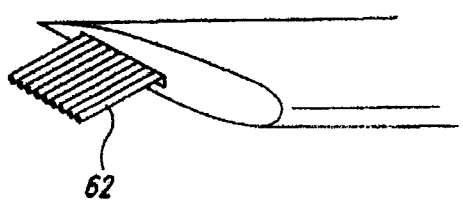

We claim:

1. An airfoil vortex dissipating system comprising:
    an airfoil having a leading edge, a trailing edge, and an outer end portion; and
    at least one nozzle positioned at, or proximate to, the outer end portion of the airfoil, wherein a characteristic of the at least one nozzle cyclically changes during operation to discharge a jet air stream in a plurality of different discharge directions, wherein the characteristic changes at a cyclic frequency sufficient to substantially dissipate a vortex generated by the airfoil.

2. The system of claim 1 wherein the characteristic of the at least one nozzle is a discharge direction of the jet air stream that cyclically changes between at least a first discharge direction and a second discharge direction.

3. The system of claim 2 wherein when the discharge direction is generally centrally located between the first discharge direction and the second discharge direction, the discharge direction has a substantial alignment component generally perpendicular to a forward to rear chord axis of the airfoil and generally parallel to an alignment reference plane of the airfoil, wherein the alignment reference plane is coincident with the forward to rear chord axis and a spanwise axis.

4. The system of claim 2 wherein when the discharge direction is in a generally central discharge direction between the first discharge direction and the second discharge direction, the discharge direction has a substantial alignment component slanting downwardly and outwardly from an alignment reference plane of the airfoil, wherein the alignment reference plane is coincident with a forward to rear chord axis and a spanwise axis.

5. The system of claim 2 wherein the characteristic changes at a cyclic frequency sufficiently high that substantial dissipation of the vortex is accomplished by alleviating the intensity of the vortex.

6. The system of claim 5 wherein the cyclic frequency is greater than two Hertz.

7. The system of claim 5 wherein the cyclic frequency is at least as great as about five Hertz.

8. The system of claim 1 wherein the characteristic changes to move the discharge direction of the jet air stream rotatably between at least a first discharge direction and a second discharge direction through an angle of at least 30 degrees.

9. The system of claim 1 wherein the characteristic changes to move the discharge direction of the jet air stream rotatably between at least a first discharge direction and a second discharge direction through an angle of at least 60 degrees.

10. The system of claim 2 wherein the characteristic changes at a cyclic frequency sufficiently low that substantial dissipation of the vortex is accomplished at least in part by accelerating an instability which leads to vortex dissipation.

11. The system of claim 10 wherein the cyclic frequency is at least as low as about two Hertz.

12. The system of claim 10 wherein the cyclic frequency is at least as low as approximately one Hertz.

13. The system of claim 1 wherein the jet air stream comprises at least two air stream portions which are moved cyclically out of phase with one another.

14. The system of claim 13 wherein the air stream portions move in a scissors pattern.

15. The system of claim 1 wherein the cyclic frequency is constant.

16. The system of claim 1 wherein the cyclic frequency is 1 Hz.

17. The system of claim 1 wherein the characteristic changes in a continuous manner.

18. The system of claim 1 wherein the nozzle comprises an exit orifice with an elliptical shape.

19. The system of claim 1 wherein the nozzle comprises an exit orifice with a circular shape.

20. The system of claim 1 wherein the at least one nozzle comprises a convergent nozzle shape.

21. The system of claim 1 wherein the at least one nozzle comprises a convergent-divergent nozzle shape.

22. The system of claim 1 wherein the nozzle is configured to discharge the jet air stream at a speed that is a function of at least one of aircraft weight, chordwise length of the at least one nozzle, number of nozzle orifices, and orifice diameter.

23. The system of claim 1 wherein a discharge diameter of the at least one nozzle is selected to be a function of aircraft weight, jet air stream velocity, length of the at least one nozzle, and number of nozzle orifices.

24. The system of claim 1 wherein the jet air stream is discharged at a speed of at least Mach 0.3.

25. The system of claim 1 wherein the jet air stream is discharged at a speed of between Mach 0.3 to Mach 0.9.

26. A method of dissipating a vortex which is generated by an airfoil on a fixed wing aircraft, the airfoil having a leading edge, a trailing edge, and an outer end portion, the method comprising:
    at least partially dissipating the vortex generated by the airfoil by cyclically changing a characteristic of a jet air stream between a first state and a second state in a time-dependent manner, with the characteristic changing in a continuous manner between temporally adjacent states, the jet air stream being directed from at least one nozzle located at least proximate to the outer end portion of the airfoil.

27. The method of claim 26 wherein changing a characteristic comprises changing a discharge direction of the jet air stream between at least a first discharge direction and a second discharge direction.

28. The method of claim 27 wherein changing the characteristic of the jet air stream comprises moving at least two air stream portions cyclically out of phase with one another.

29. The method of claim 26 wherein changing the characteristic comprises changing a discharge direction rotatably between at least a first discharge direction and a second discharge direction through an angle of at least 30 degrees.

30. The method of claim 26 wherein changing the characteristic comprises changing a discharge direction rotatably between at least a first discharge direction and a second discharge direction through an angle of at least 60 degrees.

31. The method of claim 26, further comprising discharging the jet air stream from the at least one nozzle in a generally central discharge direction between a first discharge direction and a second discharge direction, the generally central discharge direction having a substantial alignment component generally perpendicular to a chord axis of the airfoil and generally parallel to an alignment reference plane of the airfoil, the alignment reference plane being coincident with a forward to rear chord axis and a spanwise axis.

32. The method of claim 26, further comprising discharging the jet air stream from the at least one nozzle in a generally central discharge direction between a first discharge direction and a second discharge direction, the generally central discharge direction having a substantial alignment component slanting downwardly and outwardly from an alignment reference plane of the airfoil, the alignment reference plane being coincident with a forward to rear chord axis and a spanwise axis.

33. The method of claim 26 wherein changing the characteristic comprises changing a discharge direction at a cyclic frequency sufficiently high that dissipation of the vortex is accomplished at least in part by alleviating the intensity of the vortex.

34. The method of claim 33 wherein the cyclic frequency is greater than two Hertz.

35. The method of claim 33 wherein the cyclic frequency is at least as great as about five Hertz.

36. The method of claim 26 wherein changing the characteristic comprises changing a discharge direction at a cyclic frequency sufficiently low that dissipation of the vortex is accomplished at least in part by accelerating instability which leads to substantial vortex dissipation.

37. The method of claim 36 wherein the cyclic frequency is at least as low as about two Hertz.

38. The method of claim 36 wherein the cyclic frequency is at least as low as approximately one Hertz.

39. The method of claim 26 wherein the characteristic is changed in a continuous manner.

40. An airfoil vortex dissipating system comprising:
an airfoil having a leading edge, a trailing edge, and an outer end portion;
at least one nozzle located at, or proximate to, the outer end portion of the airfoil, wherein a characteristic of the at least one nozzle cyclically changes during operation to discharge a jet air stream in a plurality of discharge directions, and wherein the characteristic chances at a cyclic frequency sufficient to substantially dissipate a vortex generated by the airfoil; and
a pressurized air inlet section positioned to supply pressurized air to the at least one nozzle.

41. The system of claim 40 wherein the characteristic includes a discharge direction and changes between a first discharge direction and a second discharge direction through an angle of at least 30 degrees.

42. The system of claim 40 wherein the characteristic includes a discharge direction and changes between a first discharge direction and a second discharge direction through an angle of at least 60 degrees.

43. The system of claim 40 wherein the characteristic changes at a cyclic frequency sufficiently high that substantial dissipation of the vortex is accomplished at least in part by alleviating the intensity of the vortex.

44. The system of claim 43 wherein the frequency is greater than two Hertz.

45. The system of claim 43 wherein the cyclic frequency is at least as great as about five Hertz.

46. The system of claim 40 wherein the characteristic changes at a cyclic frequency sufficiently low that substantial dissipation of the vortex is accomplished at least in part by accelerating an instability which leads to vortex substantial dissipation.

47. The system of claim 46 wherein the cyclic frequency is at least as low as about two Hertz.

48. The system of claim 46 wherein the cyclic frequency is at least as low as approximately one Hertz.

49. The system of claim 40 wherein the characteristic comprises a discharge direction of the jet air stream and changes between at least a first discharge direction, a second discharge direction, and a third discharge direction.

50. A method of dissipating a vortex which is generated by an airfoil, the airfoil having a leading edge, a trailing edge, and an outer end portion, the method comprising:
discharging a jet air stream from at least one nozzle into the vortex; and
at least substantially dissipating the vortex by cyclically changing a characteristic of the jet air stream to direct at least a portion of the jet air stream in a plurality of discharge directions.

* * * * *

UNITED STATES PATENT AND TRADEMARK OFFICE
CERTIFICATE OF CORRECTION

PATENT NO. : 7,597,289 B2
APPLICATION NO. : 11/332835
DATED : October 6, 2009
INVENTOR(S) : Arvin Shmilovich et al.

It is certified that error appears in the above-identified patent and that said Letters Patent is hereby corrected as shown below:

Title page should be deleted and substitute therefor the attached title page.

Signed and Sealed this

Thirteenth Day of July, 2010

David J. Kappos
*Director of the United States Patent and Trademark Office*

Drawings
Delete Figure 1 and replace with the attached Figure 1.

Delete Figure 2 and replace with the attached Figure 2.

Drawings
Delete Figures 3 and 4, and replace with the attached Figures 3 and 4.
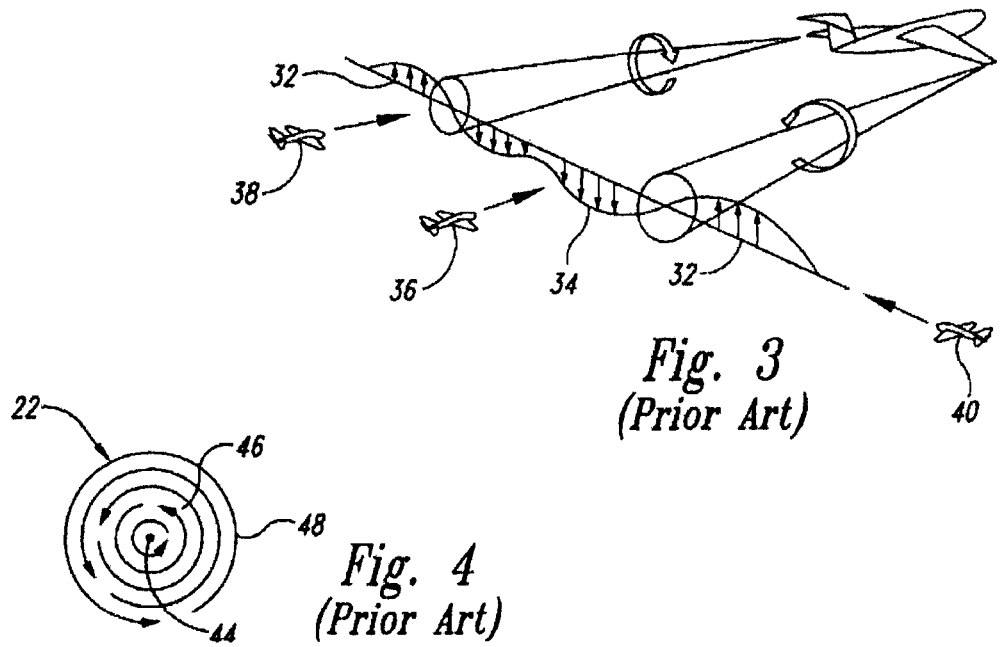
Fig. 3
*(Prior Art)*
Fig. 4
*(Prior Art)*
Delete Figure 5A and replace with the attached Figure 5A.
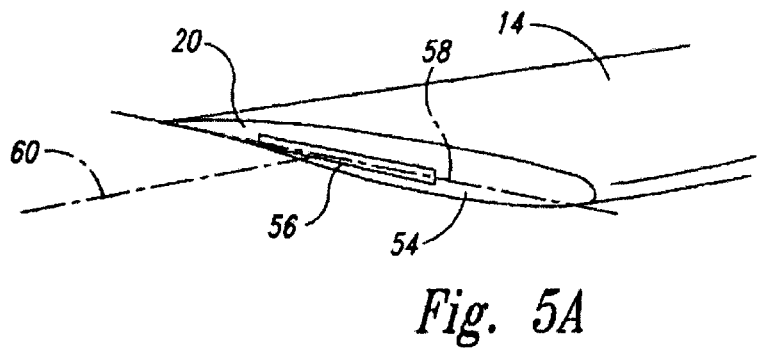
Fig. 5A

Drawings

Delete Figures 5B and 5C, and replace with the attached Figures 5B and 5C.

Delete Figure 5D and replace with the attached Figure 5D.

Drawings
Delete Figure 6 and replace with the attached Figure 6.

Delete Figure 7 and replace with the attached Figure 7.

CERTIFICATE OF CORRECTION (continued)
U.S. Pat. No. 7,597,289 B2

Drawings
Delete Figure 8 and replace with the attached Figure 8.

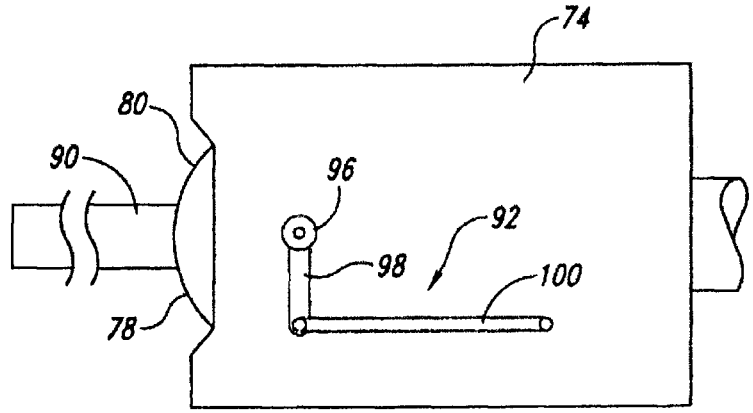

Fig. 8

Figure 9A:
Figure 9B:

Delete Figures 9A and 9B, and replace with the attached Figures 9A and 9B.

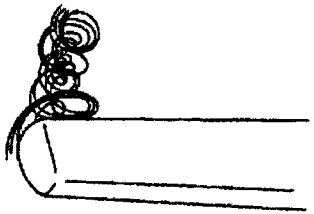 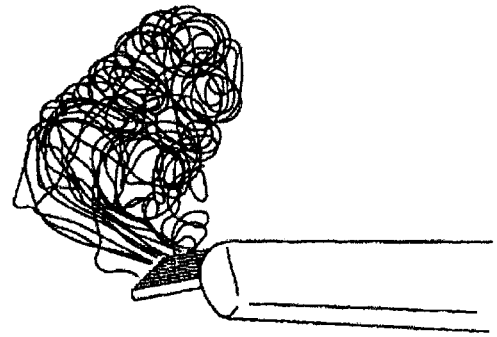

Fig. 9A      Fig. 9B

Drawings
Delete Figures 9C-1 and 9D-1 and replace with the attached Figures 9C-1 and 9D-1.
BEFORE ACTIVATION                    AFTER ACTIVATION
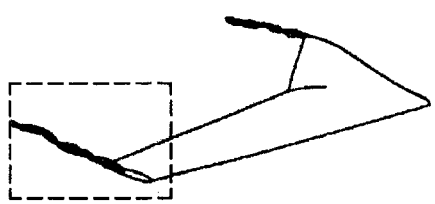        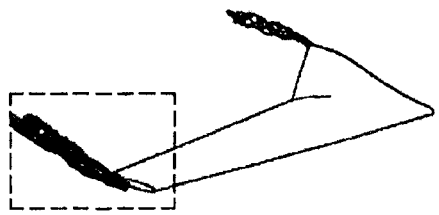
*Fig. 9C-1*                          *Fig. 9D-1*
Delete Figures 9C-2 and 9D-2, and replace with the attached Figures 9C-2 and 9D-2.
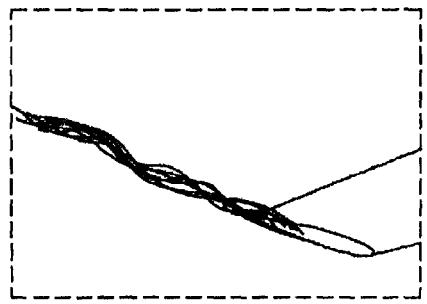        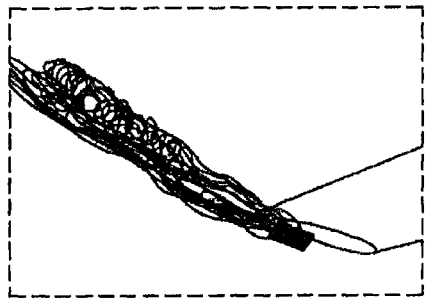
*Fig. 9C-2*                          *Fig. 9D-2*

Figure 10A:
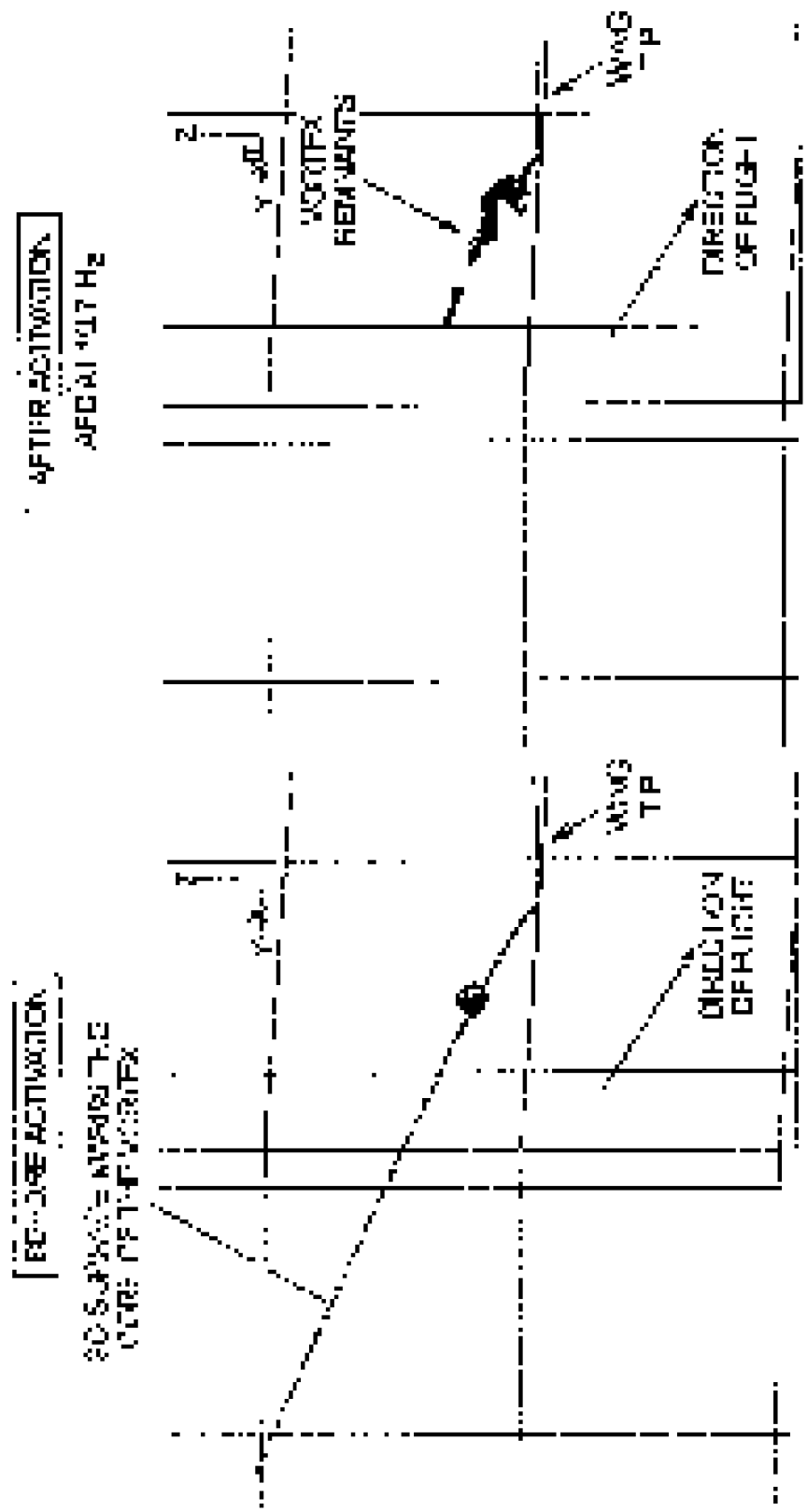
FIGS. 10A, 10B, and 10C displays an iso-surface representing the vortex before activation of the apparatus and after activation where the operating frequency is 10.7 Hz.

Drawings
Delete Figure 10A and replace with the attached Figure 10A.

Figure 10B:
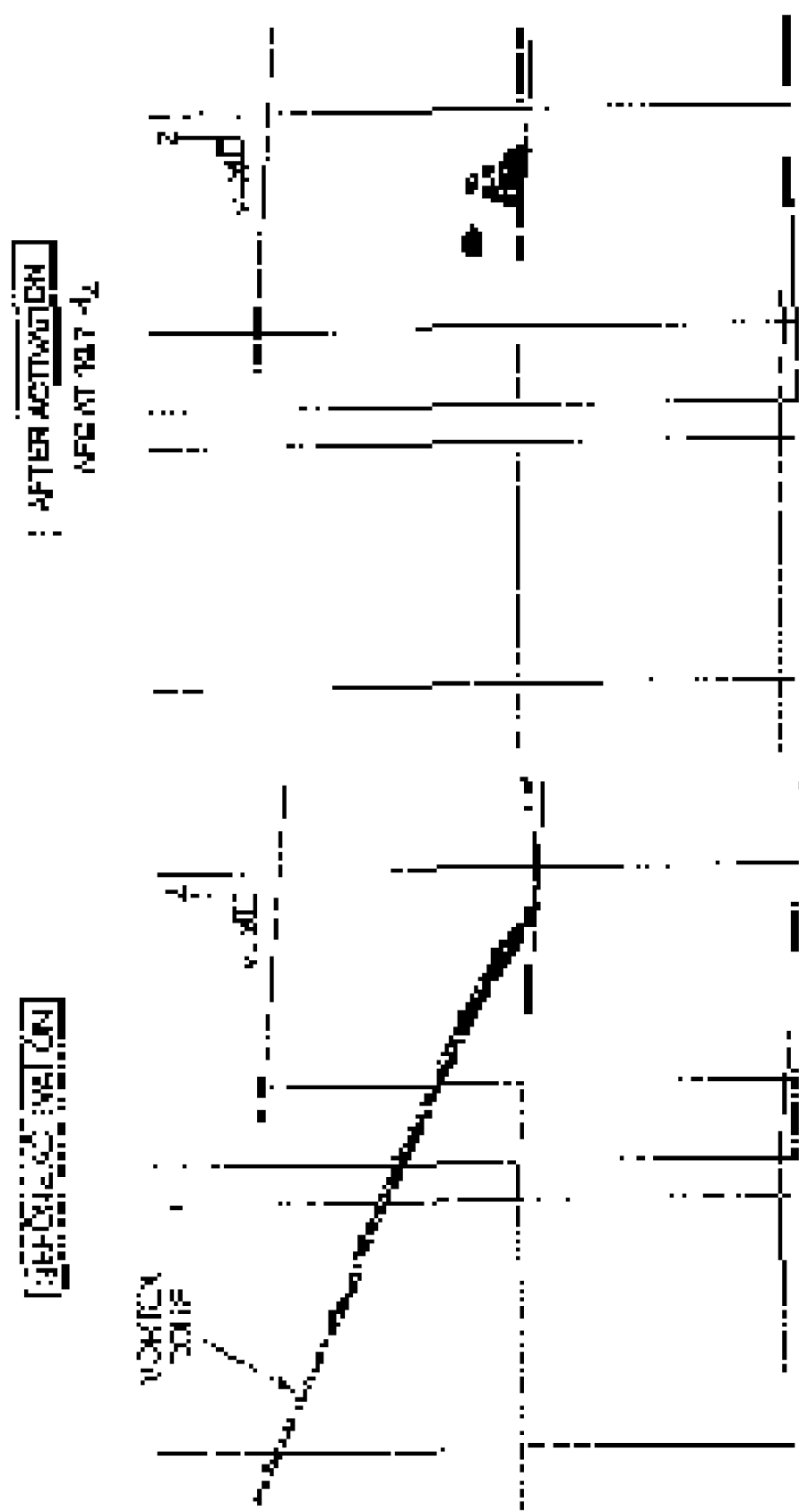

Delete Figure 10B and replace with the attached Figure 10B.

Figure 10C:
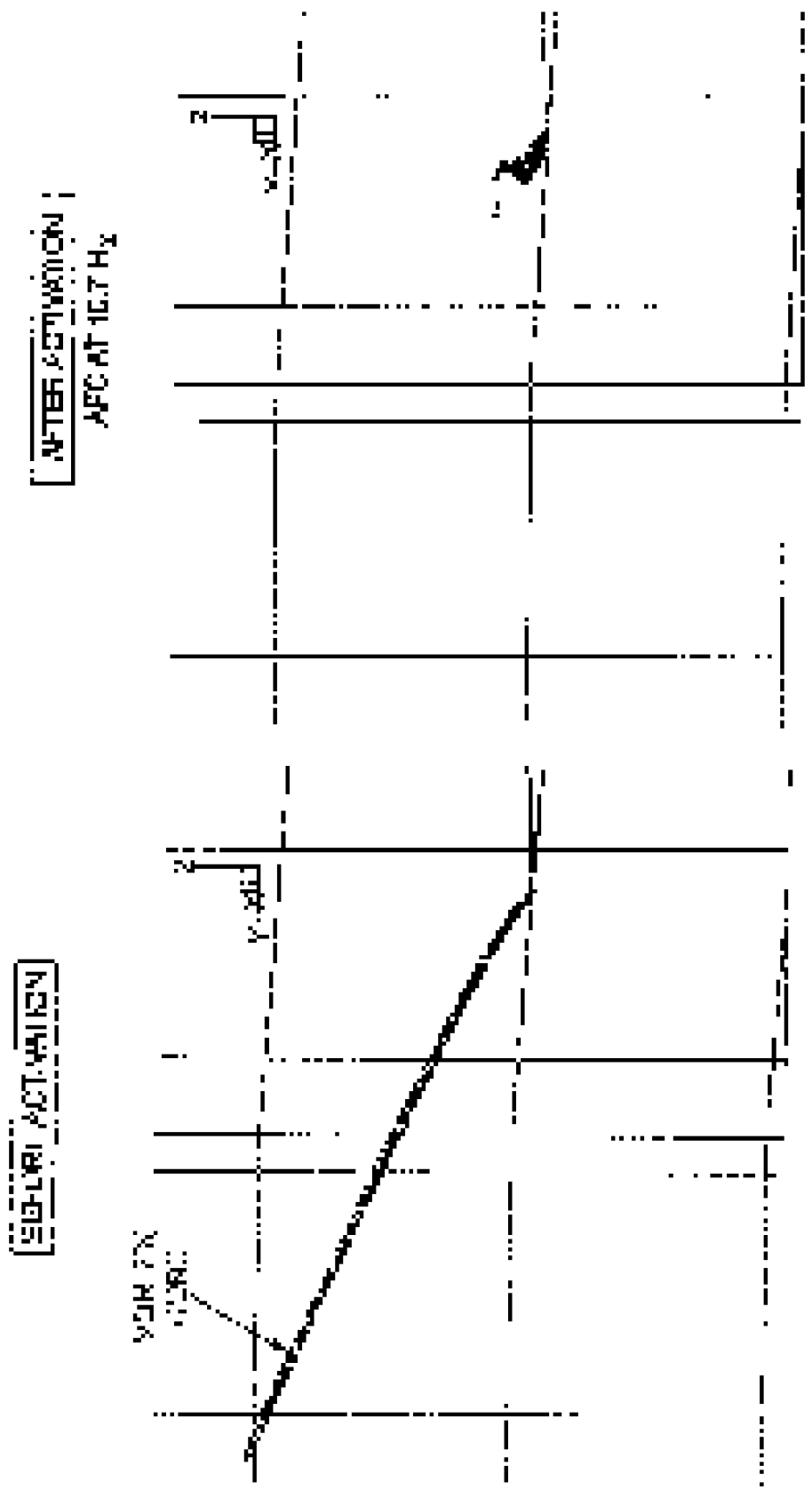

Drawings
Delete Figure 10C and replace with the attached Figure 10C.

Drawings
Delete Figure 11A and replace with the attached Figure 11A.

Drawings
Delete Figure 11B and replace with the attached Figure 11B.

Drawings

Delete Figure 11C and replace with the attached Figure 11C.

Drawings
Delete Figure 12A and replace with the attached Figure 12A.

Drawings

Delete Figure 12B and replace with the attached Figure 12B.

Drawings
Delete Figure 12C and replace with the attached Figure 12C.

Drawings
Delete Figure 13A and replace with the attached Figure 13A.

Drawings
Delete Figure 13B and replace with the attached Figure 13B.

Drawings
Delete Figure 13C and replace with the attached Figure 13C.

Delete Figures 14A and 14B, and replace with the attached Figures 14A-14B.

Figure 14C:
Figure 14D:
Figure 14E:
Figure 1:
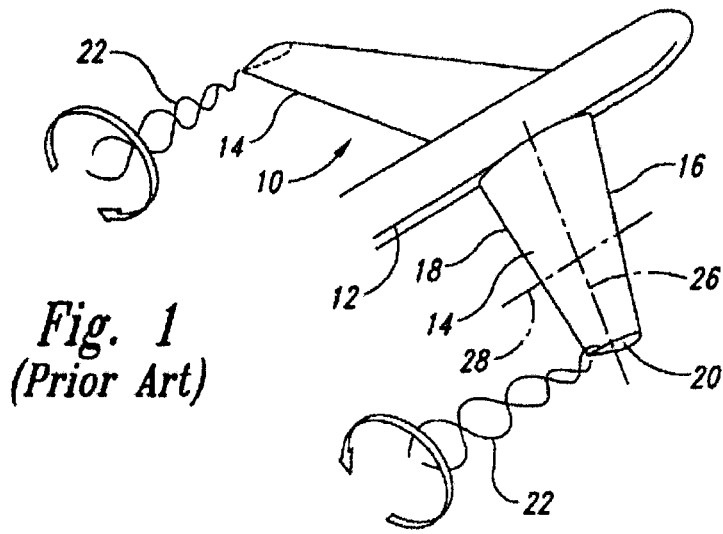
Figure 2:
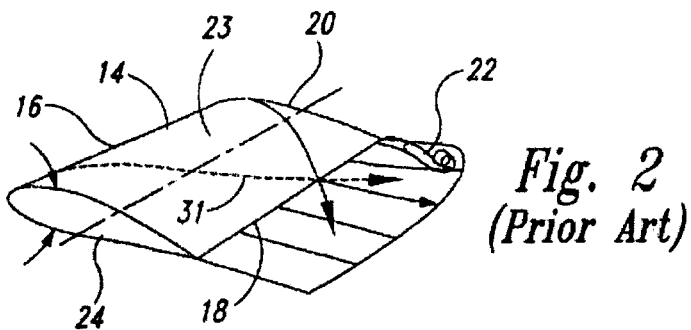
Figure 5B:
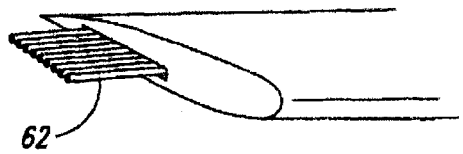
Figure 5C:
Figure 5D:
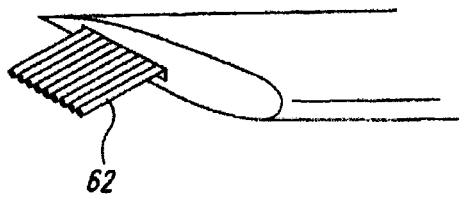
Figure 6:
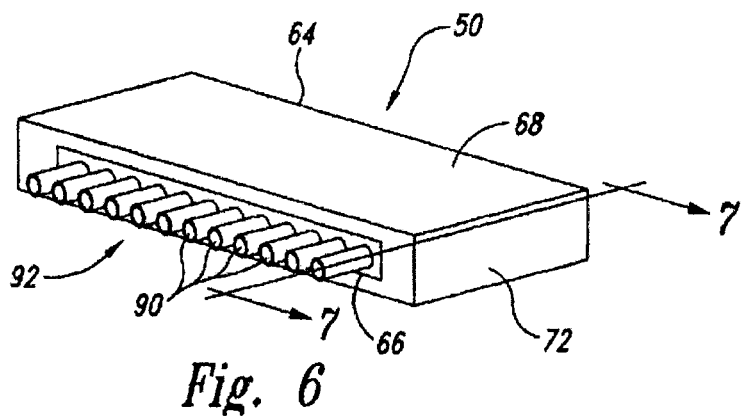
Figure 7:
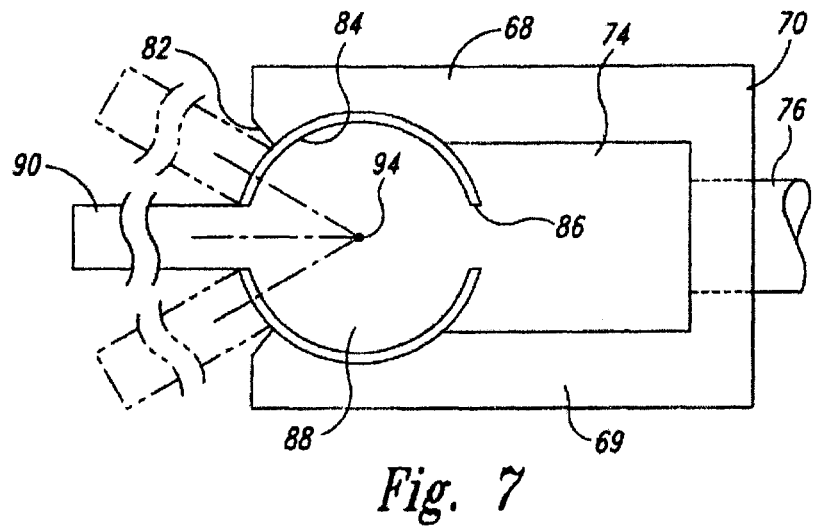
Figure 10A:
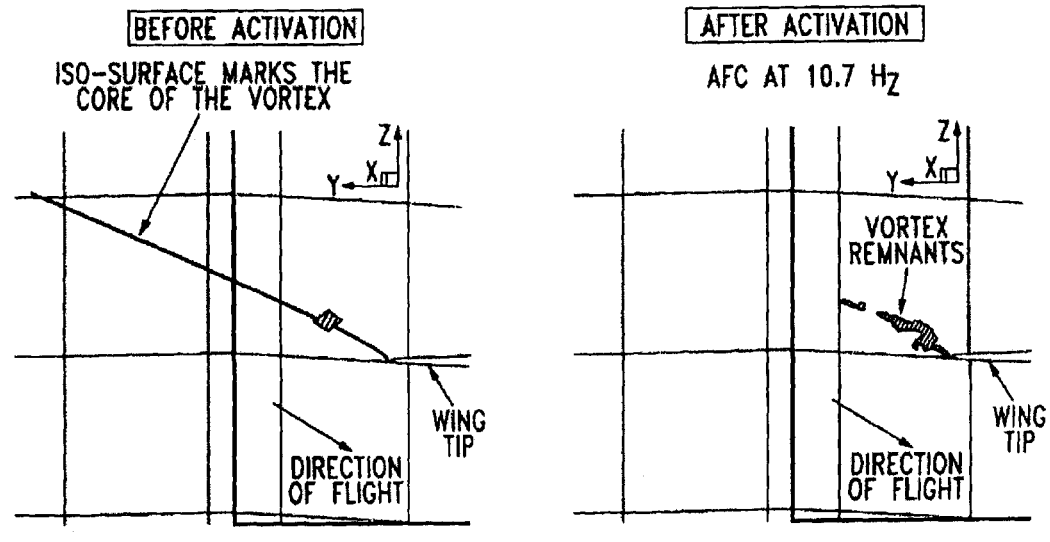
Figure 10B:
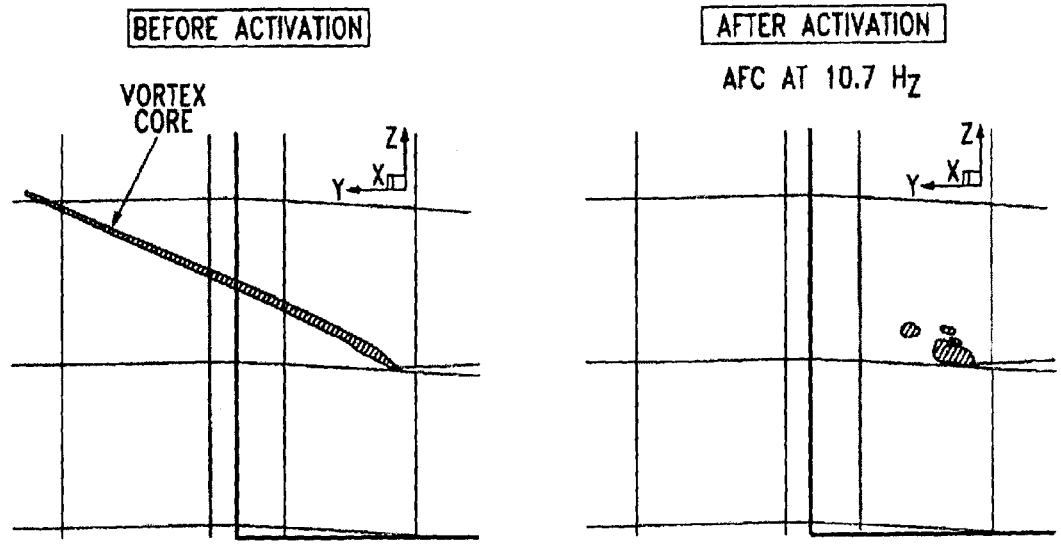
Figure 10C:
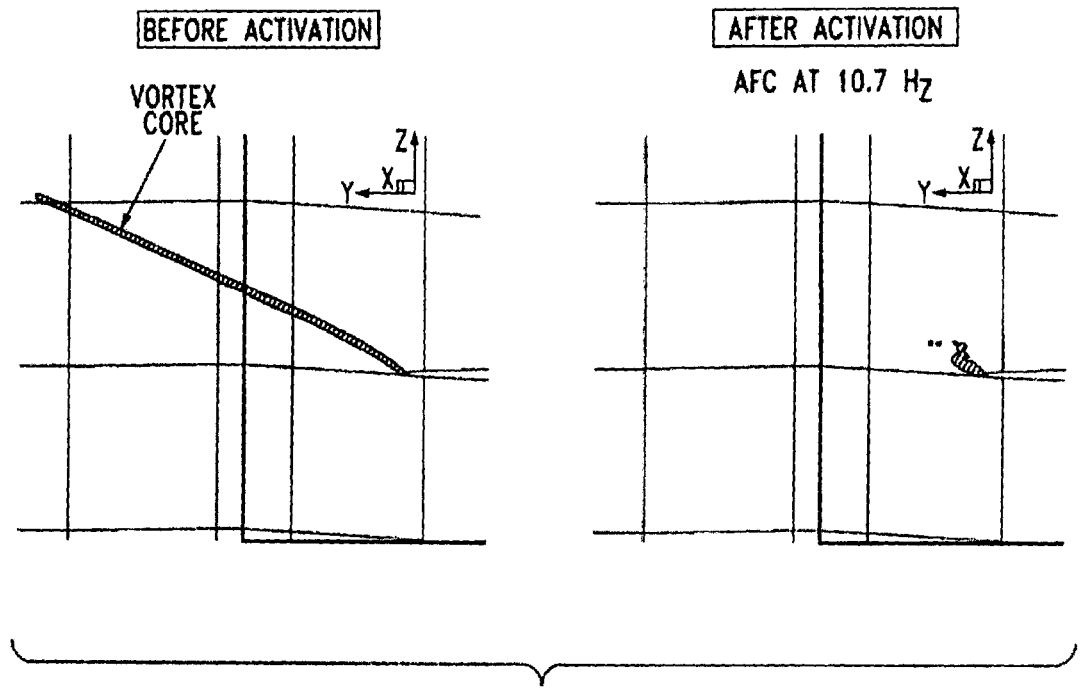
Figure 11A:
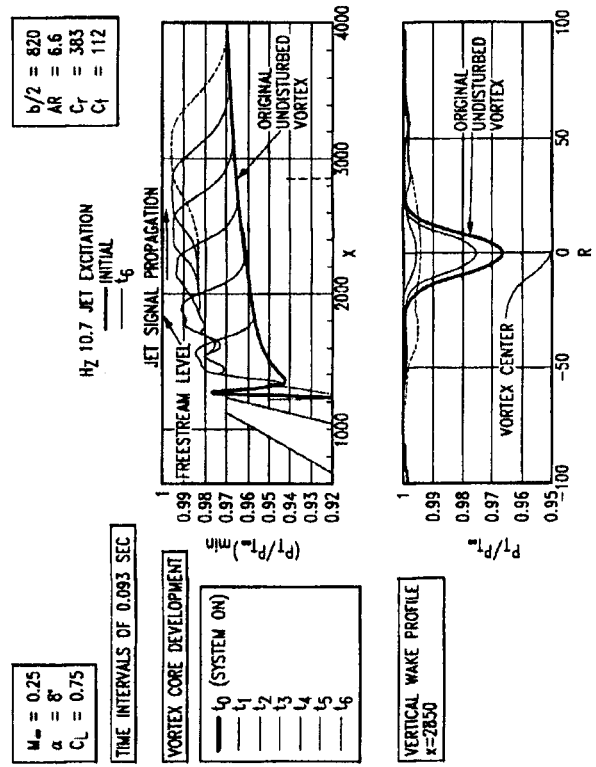
Figure 11B:
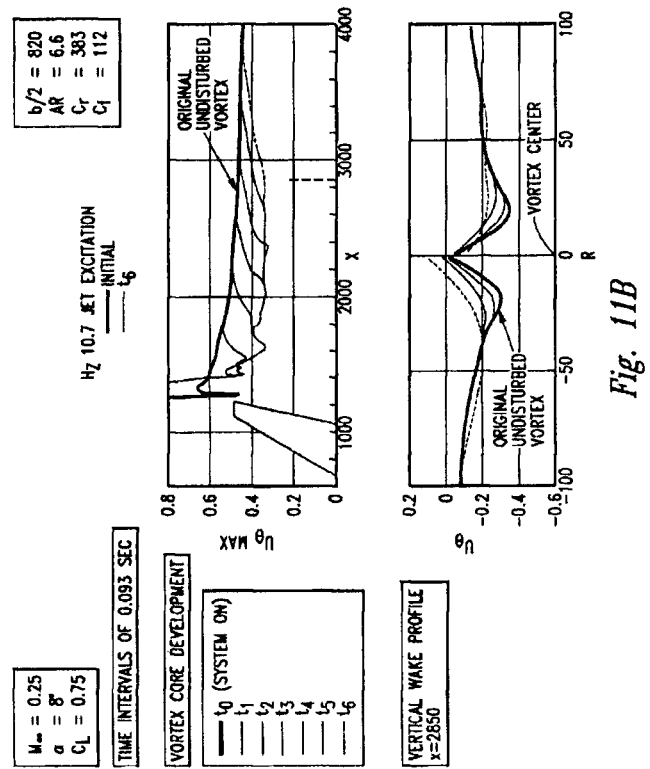
Figure 11C:
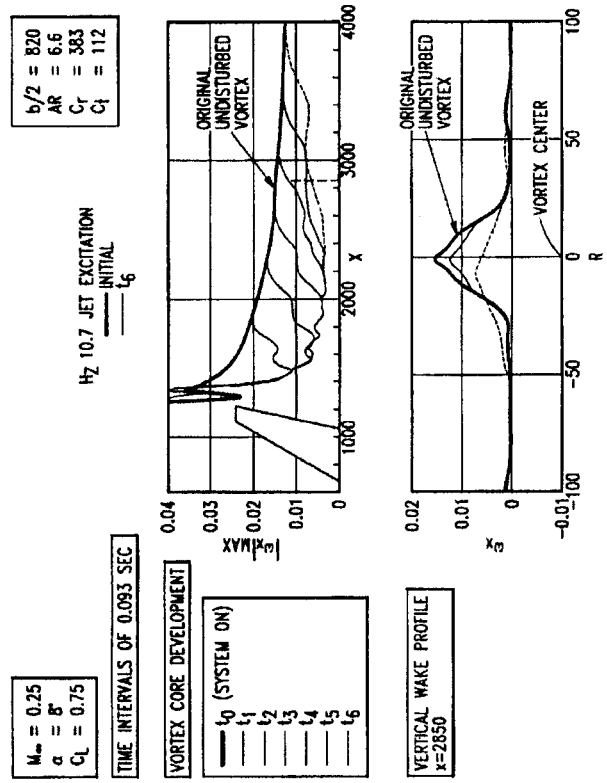
Figure 12A:
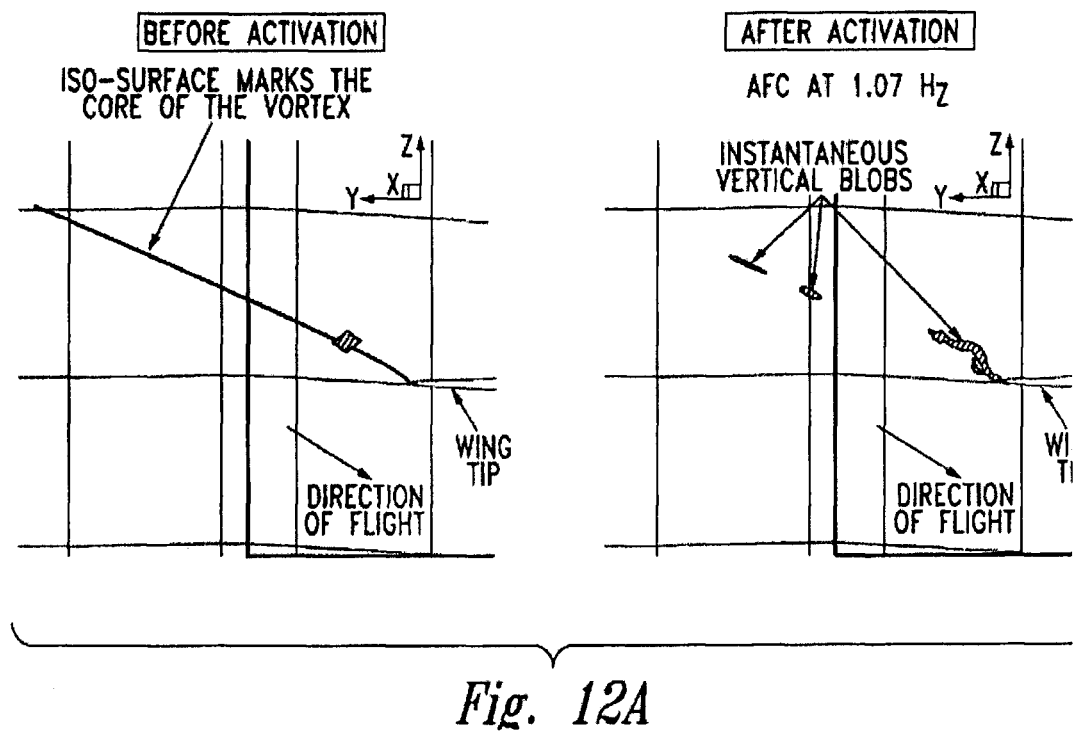
Figure 12B:
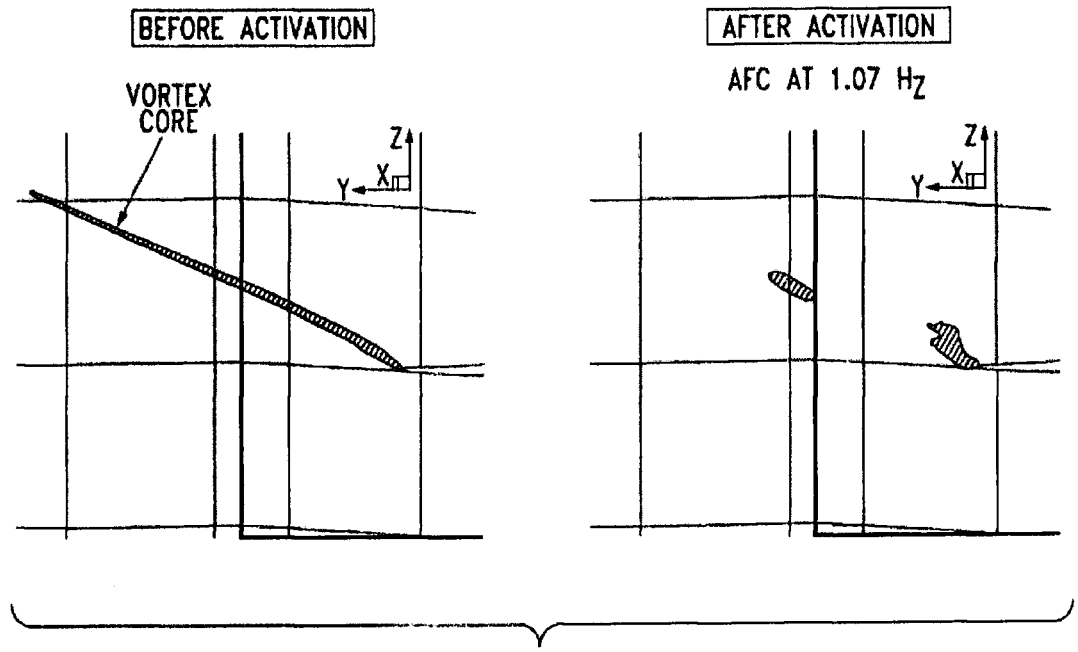
Figure 12C:
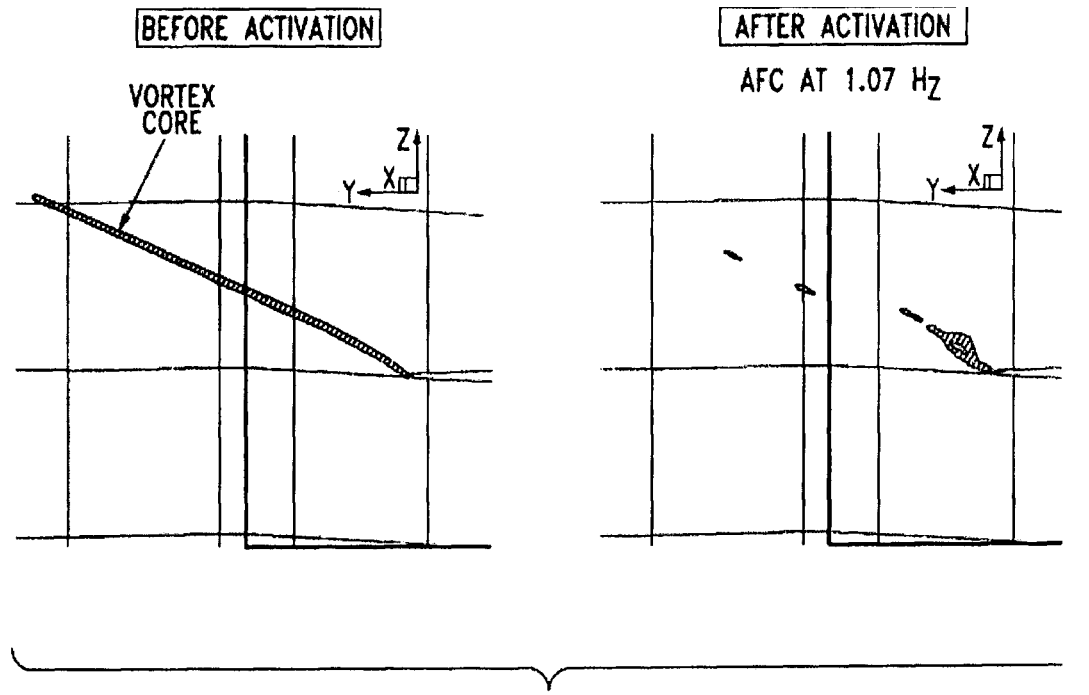
Figure 13A:
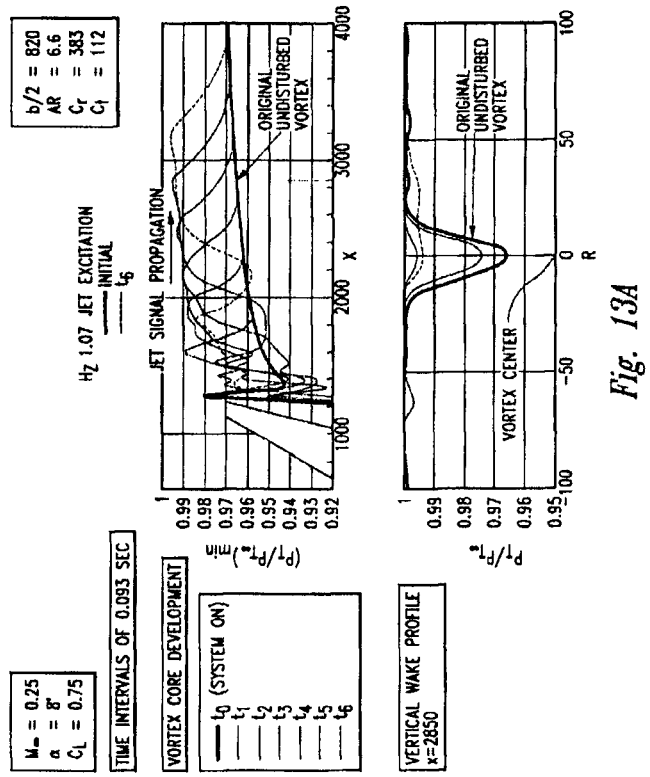
Figure 13B:
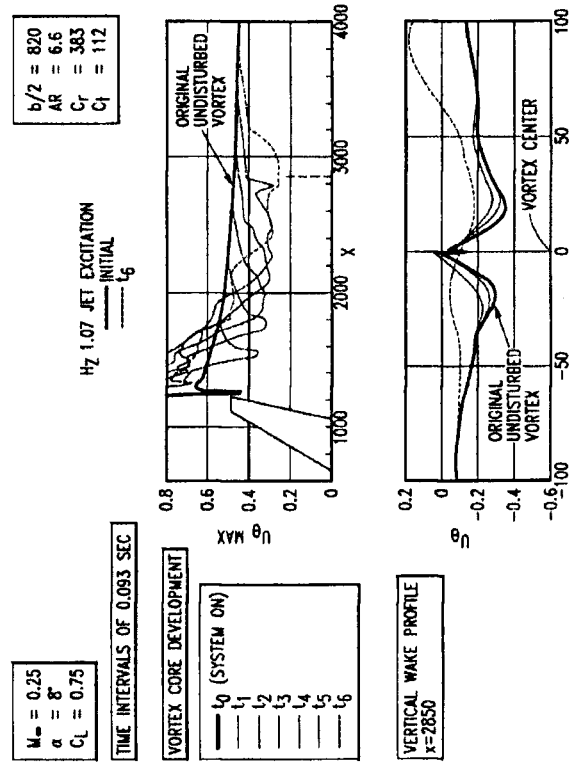
Figure 13C:
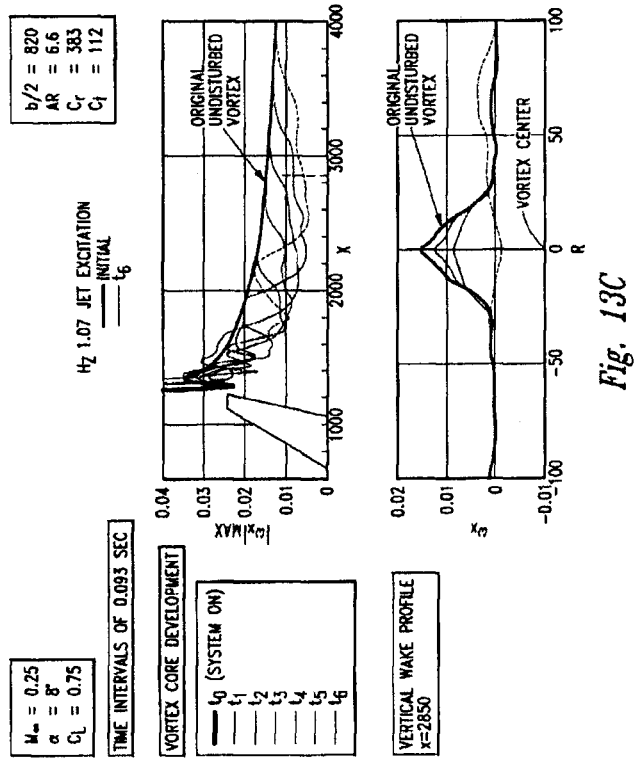
Figure 14A:
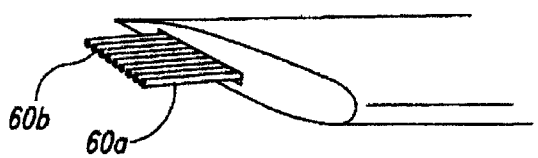
Figure 14B:
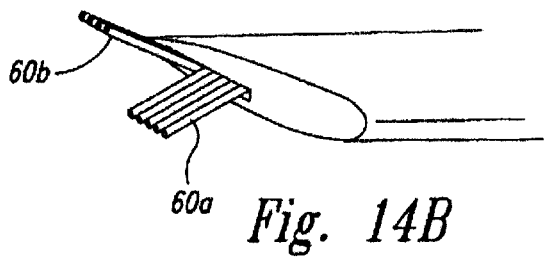
Figure 14C:
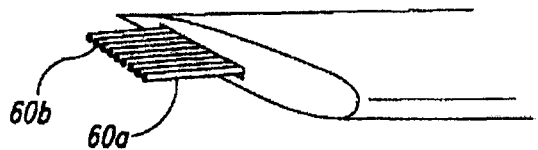
Figure 14D:
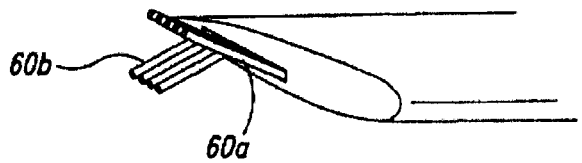
Figure 14E:
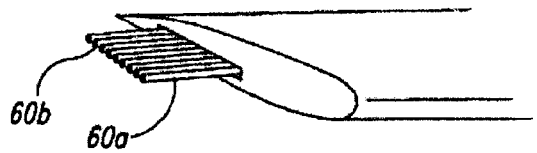

Drawings
Delete Figures 14C and 14D, and replace with the attached Figures 14C and 14D.

Delete Figure 14E and replace with the attached Figure 14E.

In column 4, line 50, delete "invention." and insert -- invention; --, therefor.

In column 4, line 56, delete "9C2," and insert -- 9C-2, --, therefor.

In column 10, line 20, after "vortices" insert -- . --.

In column 15, line 37, in claim 40, delete "chances" and insert -- changes --, therefor.

(12) United States Patent
Shmilovich et al.

(10) Patent No.: US 7,597,289 B2
(45) Date of Patent: Oct. 6, 2009

(54) APPARATUS AND METHOD FOR THE CONTROL OF TRAILING WAKE FLOWS

(75) Inventors: Arvin Shmilovich, Huntington Beach, CA (US); Yoram Yadlin, Irvine, CA (US); Roger Clark, Hungtington Beach, CA (US); Donald Leopold, Rancho Santa Margarita, CA (US)

(73) Assignee: The Boeing Company, Chicago, IL (US)

( * ) Notice: Subject to any disclaimer, the term of this patent is extended or adjusted under 35 U.S.C. 154(b) by 454 days.

(21) Appl. No.: 11/332,835

(22) Filed: Jan. 13, 2006

(65) Prior Publication Data

US 2007/0045476 A1     Mar. 1, 2007

Related U.S. Application Data

(63) Continuation of application No. 10/784,067, filed on Feb. 20, 2004, now Pat. No. 7,100,875.

(51) Int. Cl.
*B64C 23/00* (2006.01)

(52) U.S. Cl. .................. 244/199.3; 244/207

(58) Field of Classification Search .............. 244/35 A, 244/130, 199.1, 199.2, 199.3, 199.4, 207
See application file for complete search history.

(56) References Cited

U.S. PATENT DOCUMENTS

| | | | | |
|---|---|---|---|---|
| 2,477,461 A | * | 7/1949 | Lee | 244/199.3 |
| 2,650,781 A | | 9/1953 | Taylor | |
| 3,012,740 A | | 12/1961 | Wagner | |
| 3,090,584 A | | 5/1963 | Kuchemann et al. | |
| 3,480,234 A | | 11/1969 | Cornish | |
| 3,596,854 A | * | 8/1971 | Haney, Jr. | 244/199.3 |
| 3,604,661 A | * | 9/1971 | Mayer, Jr. | 244/207 |
| 3,692,259 A | * | 9/1972 | Yuan | 244/199.3 |
| 3,841,587 A | | 10/1974 | Freed | |
| 3,845,918 A | | 11/1974 | White, Jr. | |
| 3,881,669 A | * | 5/1975 | Lessen | 244/199.3 |
| 3,936,013 A | | 2/1976 | Yuan | |

(Continued)

FOREIGN PATENT DOCUMENTS

DE     1756541     4/1970

(Continued)

OTHER PUBLICATIONS

Lewellen, D.C. et al., "Large-Eddy Simulations and Lidar Measurements of Vortex-Pair Breakup in Aircraft Wakes," Aug. 8, 1998, AIAA Journal, vol. 36 No. 8, pp. 1439-1445.

(Continued)

*Primary Examiner*—Rob Swiatek
(74) *Attorney, Agent, or Firm*—Perkins Coie LLP

(57) ABSTRACT

A system and method for dissipating vortices that form at the wingtips on aircraft and from other airfoils. A jet air stream is discharged in a location at or proximate to the outer end portion of the airfoil into the vortex flow, and the jet air stream is moved cyclically back and forth. The cyclic movement can be at lower or higher frequencies to alleviate at least in part intensity of the vortex or accelerate instability of the vortex which leads to vortex dissipation.

50 Claims, 18 Drawing Sheets